United States Patent
Wutti et al.

(10) Patent No.: US 11,084,954 B2
(45) Date of Patent: Aug. 10, 2021

(54) METHOD FOR CURING AN ADHESIVE USING MICROWAVE IRRADIATION

(71) Applicant: PROIONIC GMBH, Grambach (AT)

(72) Inventors: Robert Wutti, Graz (AT); Roland Kalb, Sinabelkirchen (AT)

(73) Assignee: PROIONIC GMBH, Grambach (AT)

( * ) Notice: Subject to any disclaimer, the term of this patent is extended or adjusted under 35 U.S.C. 154(b) by 56 days.

(21) Appl. No.: 16/266,944

(22) Filed: Feb. 4, 2019

(65) Prior Publication Data

US 2019/0169469 A1 Jun. 6, 2019

Related U.S. Application Data

(62) Division of application No. 15/039,129, filed as application No. PCT/EP2014/075968 on Nov. 28, 2014, now abandoned.

(30) Foreign Application Priority Data

Nov. 29, 2013 (EP) .................................... 13195017

(51) Int. Cl.
*C09J 5/06* (2006.01)
*C09J 11/06* (2006.01)

(52) U.S. Cl.
CPC ........ *C09J 5/06* (2013.01); *C09J 11/06* (2013.01)

(58) Field of Classification Search
CPC .................. C09J 5/06; C09J 11/06; C08F 2/46
See application file for complete search history.

(56) References Cited

U.S. PATENT DOCUMENTS

| | | | |
|---|---|---|---|
| 4,906,497 A | 3/1990 | Hellmann | |
| 5,340,649 A * | 8/1994 | Roeker | B29C 66/91221 428/344 |
| 2002/0056633 A1 | 5/2002 | Westman | |
| 2005/0266238 A1 | 12/2005 | Amano | |
| 2006/0100323 A1 | 5/2006 | Schmidt | |

FOREIGN PATENT DOCUMENTS

| | | |
|---|---|---|
| DE | 10040325 | 3/2001 |
| EP | 1519913 | 4/2005 |
| JP | 2009149828 | 7/2009 |
| JP | 2009167362 | 7/2009 |
| JP | 2009227949 | 10/2009 |
| WO | 9302867 | 2/1993 |
| WO | 9924520 | 5/1999 |
| WO | 2008071768 | 6/2008 |
| WO | 2011/025847 | 3/2011 |

OTHER PUBLICATIONS

Tsudo et al., machine English translation of JP 2009-227949 (Year: 2009).*
Tsudo, machine English translation of JP 2009-149828 (Year: 2009).*
Bosman et al., "Microwave absorption on a thin film", Applied Physics Letters, Mar. 3, 2003, pp. 1353-1355, vol. 82, No. 9, American Institute of Phyics.
Bregar, "Advantages of Ferromagnetic Nanoparticle Composites in Microwave Absorbers", IEEE Transactions on Magnetics, May 2004, pp. 1679-1684, vol. 40, No. 3.
Chandrasekhar, "Broadband microwave absorption and shielding properties of a Poly(aniline)", Synthetic Metals, 1999, pp. 115-120, 105.
Freemantle, "Eyes on Ionic Liquids", Chem. Eng. News, 2000, pp. 37-50.
Martínez-Palou, "Microwave-assisted synthesis using ionic liquids", Molecular Diversity, 2010, pp. 3-25, 14, (1).
Morris, "Ionic liquids and Microwaves—Making Zeolites for Emerging Applications", Angewandte Chemie, International Edition, 2008, pp. 442-444, 47, (3).
Peng et al., "Microwave-absorbing characteristics for the composites of thermal-plastic polyurethane (TPU)-bonded NiZn-ferrites prepared by combustion synthesis method", Materials Science and Engineering, pp. 27-36, B, 117,1.
Petrov et al, "Microwave Absorbing Materials", Inorganic Materials, 2001, pp. 93-98. vol. 37, No. 3.
Phang et al, "Poly(4,4'-diphenylene diphenylvinylene) as a nonmagnetic microwave absorbing conjugated polymer", Thin Solid Films, 2005, pp. 125-130, 477.
Rogers et al., "Ionic Liquids—Industrial Applications to Green Chemistry", ACS Symposium Series 818, 2002.
Truong et al, "Polypyrrole based microwave absorbers", Journal of Material Science, pp. 4971-4976, 33, 20.
Wasserscheid et al, "Ionic Liquids in Synthesis", Verlag Wiley-VCH 2003; ISBN 3-527-30515-7.
Zou et al, "The influence of temperature on magnetic and microwave absorption properties of Fe/graphite oxide nanocomposites", Journal of Magnetism and Magnetic Materials, 2006, pp. 343-347, 302, 2.
IPRP cited in PCT Application No. PCT/EP2014/075968 dated May 31, 2016.

* cited by examiner

*Primary Examiner* — Jessica M Roswell
(74) *Attorney, Agent, or Firm* — Workman Nydegger (57) ABSTRACT

The present invention relates to a method method for bonding a thermoplastic material by way of providing a thermoplastic material, applying an ionic liquid to a surface of the thermoplastic material, contacting the thermoplastic material with a separate material, and exposing the resulting arrangement to microwave radiation to melt the surface of the thermoplastic material to which the ionic liquid was applied and allow the adherence of the thermoplastic material to the separate material.

22 Claims, 3 Drawing Sheets

METHOD FOR CURING AN ADHESIVE USING MICROWAVE IRRADIATION

CROSS-REFERENCE TO RELATED APPLICATIONS

This application is a divisional of U.S. patent application Ser. No. 15/039,129, filed on May 25, 2016, which is a national stage filing under 35 U.S.C. § 371 of International Patent Application No. PCT/EP2014/075968, filed on Nov. 28, 2014, the entirety of each of which is incorporated herein by this reference.

BACKGROUND

The present invention relates to a method for curing an adhesive using microwaves.

The word-wide market for adhesives, sealing agents and surface technology deals in the range of about 50 billion US$ per year, further increasing due to the development of the threshold countries (source: Henkel AG Co. KgaA 2010). Many million tons of adhesives per year are currently used in countless applications by industry, construction, handicraft and final consumers, e.g., for bookbinding, for packaging and labelling purposes, cigarettes, sanitary products, for joining materials like wood, plastics, elastomers, rubber, metal, glass, textile and composites based thereupon, for the production of shoes, for adhering carpets and tapestries, as additives in cement and concrete, in prefabricated houses, in the production of automobiles, airplanes and ships, in the production of electronic components and printed boards, mobile phones, laptops, screens and computers, in the medicinal field, for domestic use.

The used types of adhesives are defined, e.g., in the standard DIN EN 923, comprising among others: physically binding adhesives, e.g., hot melt adhesives, solvent containing wet adhesives, contact adhesives, dispersive adhesives, adhesives based on water and plastisol, chemically curing one- or two-component adhesives (reactive adhesives), such as polymerisation adhesives, e.g., cyanoacrylate and methyl methacrylate adhesives, anaerobically curing adhesives, unsaturated polyester resins, radiation curing adhesives, polycondensation adhesives, e.g., phenol-formaldehyde resin adhesives, cross-linked silicone polymers, silane-cross-linked polymer adhesives, polyimide adhesives, poly-sulfide adhesives, polyaddition adhesives, e.g., epoxy resin adhesives, polyurethane adhesives, silicones, vulcanizing adhesives and adhesives without solidifying mechanism, e.g., pressure sensitive adhesives.

The terms "use" or "application" of adhesives, in the sense of this patent, comprises not only joining and gluing of material parts for the purpose of a mechanic connection but rather also the application as a sealing agent, bonding agent, for the sealing and coating of any kind of surfaces and interfaces.

With the application of all these types of adhesives, apart from the kind and configuration of the parts to be glued and the atmosphere surrounding (humidity and flow rate of the surrounding air, influence of light and oxygen) as well as the contact pressure, in particular the temperature acting thereon and the duration and quality of the adhesion process affected by the temperature do play an important role. As examples, there are to be mentioned:

with hot melt adhesives, the adhesive will only liquefy at a defined temperature,
with solvent containing wet or dispersive adhesives, the temperatures will determine the rate of evaporation,
with plastisols, the adhesive dispersion will transform into the proper adhesive gel at a defined temperature, with the adhesion promoting agent being activated,
with reactive adhesives (adhesives with chemical crosslinking or curing mechanism, respectively) having one or two components as well as with vulcanizing adhesives, the temperature will have a decisive effect on the starting time of polymerisation and the rigidity and quality and the duration of the adhesion process to be achieved, etc.

From the EP 1 519 988 B2 there have been known hot melt adhesives, which contain a polymer composition and an ionic liquid. Due to the presence of ionic moieties in the ionic liquid, the adhesion behaviour of the polymer composition to polar surfaces or surfaces swollen or dissolved due to the ionic liquids may be improved.

In order to adjust the temperature in conventional adhesion procedures, both parts to be glued together have to be heated accordingly for the desired period of time, i.e. not only the contact area for adhesion and the immediate surrounding but rather essential parts or the entire workpieces. In the case of bigger workpieces having an accordingly large heat capacity and in large quantities—e.g., in adhesion processes in the automobile industry—this will result in significant expenditures of time and energy. In the case of bigger workpieces it is further not easily possible to very exactly control the duration of heating and, e.g., having a very high temperature only acting thereon for a short period, as the heating and cooling curves will be relatively flat due to the high heat capacity of the workpiece. For this reason, hence, it is also not possible to heat the adhesive area to temperatures above the thermal decomposition temperature of the workpiece in a short-term and local way.

In order to enable the introduction of energy for heating the adhesive area selectively and to overcome the disadvantages mentioned above, there have been made experiments using microwave irradiation. Microwave irradiation is defined as electromagnetic radiation in the frequency range of 300 MHz-300 GHz (see, e.g., CD Römpp Chemie Lexikon 1.0) with the common standard frequencies of 2.45 GHz and 915 MHz. In the sense of this application, there are, however, also claimed electromagnetic frequencies out of the range of this definition, in particular such ranging below 300 MHz.

As adhesives in general do not exhibit an especially good coupling behaviour, there were added microwaves absorbing pigments and (nano-) particles, which may be composed of, e.g., graphite, carbon black, metals, ferroelectrics such as ferrite, iron carbonyl, quartz crystal, tourmaline, barium titanate, lithium sulphate, potassium sodium tartrate, ethylene diamintartrate and lead-circonium-titanate. There were also carried out tests using electrically conductive polymers such as polyaniline, polypyrrole, polyalkyl thiophene and poly(4,4'-diphenylendiphenyl vinylene) (see, e.g., Bosman et al. (2003), *Appl. Phys. Lett.,* 82, 9, 1353-1355; Peng, C. H. et al. (2005), *Mater. Sci. Eng.,* B, 117,1, 27-36; Phang, S. W. et al. (2005), *Thin Solid Films,* 477, 1-2, 125-130; Bregar, V. B. (2004), *EEE Trans. Magn.,* 40, 3, 1679-1684; Chandrasekhar, P.; Naishadham, K. (1999), *Synth. Met,* 105, 2, 115-120; Petrov, V. M.; Gagulin, V. V. (2001), *Inorg. Mater.,* 37, 2, 93-98; Saib, A. et al. (2006), *IEEE Trans. Microwave Theor. Tech,* 54, 6, 2745-2754; Truong, V. T. et al. (1998), *J. Mater. Sci,* 33, 20, 4971-4976; Zou, Y. H. et al. (2006), *J. Magn. Magn. Mater,* 302, 2, 343-347; WO 99/24520; WO 93/02867; DE 10040325).

The use of all these particles and electrically conductive polymers, however, has some serious disadvantages in common in the adhesive practice on an industrial scale, which have been counteracting a wide-spread use of microwave adhesion up to now:

In order to achieve microwave coupling, which offers a time- and energy-related advantage in comparison with conventional heating, there have to be added very large quantities of particles—up to several 10 wt. %. This will alter in general the characteristics of the adhesive in a substantial way, leading to significant loss of performance. Rather frequently, also in the case of adding such large quantities, it has not been possible to achieve sufficient couplings.

As these particles are only fillers, they will not bind into the polymer matrix; in this way, they do not contribute to the rigidity and adhesive force of the adhesive. A chemical functionalisation of the particles is usually too complex.

The particles should be as small as possible in order to not cause any mechanical disadvantages in the course of processing, which is why nanoparticles are especially suitable. These, however, are expensive, have to be stabilised against agglomeration in a laborious way and are available on an industrial level only to a restricted extent.

The particles substantially alter the optical appearance of the adhesive surface: e.g., graphite, carbon black, metals, ferrite etc., are coloured black.

The present invention faces the task to provide an adhesive or an adhesive composition, respectively, which does/do not have the disadvantages described, or only to a minor degree, respectively.

BRIEF SUMMARY

This task is solved according to the invention by adding an ionic liquid instead of solid particles to the adhesive.

In one embodiment, a method for bonding a thermoplastic material comprises the steps of: providing a thermoplastic material; applying an ionic liquid $[A]^+_a[B]^{a-}$ to a surface of the thermoplastic material, wherein $[A]^+$ represents a cation, $[B]^{a-}$ represents an anion, and "a" represents an integer; contacting the thermoplastic material with a separate material to form an arrangement, wherein the surface of the thermoplastic material to which the ionic liquid was applied is in contact with the separate material; and exposing the arrangement to microwave radiation, whereupon the surface of the thermoplastic material to which the ionic liquid was applied melts to enable adherence of the thermoplastic material to the separate material.

In a further aspect in a method according to the present invention $[A]^+$ represents an ammonium cation $[R^1R^{1'}R^2R^3N]^+$, a phosphonium cation $[R^1R^{1'}R^2R^3P]^+$, a sulfonium cation $[R^1R^{1'}R^2S]^+$, a hetero-aromatic cation or a guanidinium cation $R^3R^{3'}N(C=NR^1R^{1'})NR^2R^{2'}$ of the formula where R1,R1',R2,R2' and R3,R3' represent hydrogen or organic residues, e.g., independently of each other hydrogen, or unsubstituted alkyl, alkenyl, alkinyl, cycloalkyl, cycloalkenyl, aryl or saturated or unsaturated heterocyclyl, e.g., heteroaryl, wherein the 7 residues mentioned last, independently of each other, may be unsubstituted or substituted by one or more halogen and/or 1 to 3 residues selected from: $(C_1-C_6)$alkyl, aryl, saturated or unsaturated heterocyclyl, e.g., heteroaryl, $(C_3-C_7)$ cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other represent hydrogen, $(C_1-C_6)$alkyl, halo$(C_1-C_6)$alkyl, cycloalkyl, in particular cyclopentyl, cyclohexyl, phenyl, tolyl or benzyl; or wherein two of the residues $R^1, R^{1'}, R^2, R^{2'}, R^3, R^{3'}$ together with the hetero atom, to which they are bound, form a saturated or unsaturated ring, which is unsubstituted or substituted, and wherein each carbon chain may be disrupted by one or several heteroatoms selected from the group consisting of O, S, NH or $N(C_1-C_4)$alkyl.

DETAILED DESCRIPTION

In one aspect the present invention provides a method for curing an adhesive composition using microwaves, characterized in that the adhesive composition contains an ionic liquid $[A]^+_a[B]^{a-}$, wherein $[A]^+$ represents a cation, $[B]^{a-}$ represent an anion and a represents an integer.

A method, which is provided according to the present invention, is herein also designated as a "method according to the present invention".

"Curing" in a method according to the present invention means achieving a predetermined target rigidity of the adhesive, e.g., in general the curing of the adhesive, regardless of whether chemical, thermal (hot melt adhesive), physical (evaporation of solvent) or in any other form such as the chemical curing of reactive adhesives in the sense of polymerisation or condensation, wherein the adhesive polymers are present already before curing and are not developed only upon the polymerisation of the monomers.

In a further aspect in a method according to the present invention $[A]^+$ represents an ammonium cation $[R^1R^{1'}R^2R^3N]^+$, a phosphonium cation $[R^1R^{1'}R^2R^3P]^+$, a sulfonium cation [R¹'R¹R²S]⁺, a hetero-aromatic cation or a guanidinium cation R³R³'N(C=NR¹R¹')NR²R²' of the formula where R1,R1',R2,R2' and R3,R3' represent hydrogen or organic residues, e.g., independently of each other hydrogen, or unsubstituted alkyl, alkenyl, alkinyl, cycloalkyl, cycloalkenyl, aryl or saturated or unsaturated heterocyclyl, e.g., heteroaryl, wherein the 7 residues mentioned last, independently of each other, may be unsubstituted or substituted by
  one or more halogen and/or
  1 to 3 residues selected from: $(C_1-C_6)$alkyl, aryl, saturated or unsaturated heterocyclyl, e.g., heteroaryl, $(C_3-C_7)$ cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other represent hydrogen, $(C_1-C_6)$alkyl, halo$(C_1-C_6)$alkyl, cycloalkyl, in particular cyclopentyl, cyclohexyl, phenyl, tolyl or benzyl; or wherein two of the residues $R^1$, $R^{1'}$, $R^2$, $R^{2'}$, $R^3$, $R^{3'}$ together with the hetero atom, to which they are bound, form a saturated or unsaturated ring, which is unsubstituted or substituted, and wherein each carbon chain may be disrupted by one or several heteroatoms selected from the group consisting of O, S, NH or $N(C_1-C_4)$alkyl.

In a method according to the present invention, a heterocycyl residue has the meaning of one of the residues of [A]⁺, in particular unsaturated and in particular selected from a 5- or a 6-membered hetero-aromatic, which has at least one nitrogen atom as well as optionally an oxygen or sulphur atom and which is unsubstituted or substituted and/or annulated, in particular selected from the group of the formula wherein
  R, $R^{1'}$ independently of each other represent hydrogen, $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, in particular heteroaryl, wherein the 6 residues last mentioned are each independently of each other unsubstituted or substituted by
    one or several halogen residues, and/or 1 to 3 residues selected from the group consisting of $(C_1-C_{30})$alkyl, aryl, saturated or unsaturated heterocyclyl, in particular heteroaryl, $(C_3-C_7)$cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other represent hydrogen, $(C_1-C_6)$alkyl, halo$(C_1-C_6)$alkyl, cycloalkyl, in particular cyclopentyl, cyclohexyl, phenyl, tolyl or benzyl;
  $R^4$, $R^5$, $R^6$, $R^7$, $R^8$ independently of each mean hydrogen, halogen, nitro, cyano, $OR^c$, $SR^c$, $NR^cR^d$, $COR^c$, $COOR^c$, $CO-NR^cR^d$, $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, in particular heteroaryl, wherein the 6 residues last mentioned are each independently of each unsubstituted or substituted by one or several halogen and/or 1 to 3 residues selected from the group consisting of $(C_1-C_6)$alkyl, aryl, saturated or unsaturated heterocyclyl, in particular heteroaryl, $(C_3-C_7)$cycloalkyl, halogen, $OR^c$, $SR^c$, $NR^cR^d$, $COR^c$, $COOR^c$, $CO—NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other represent hydrogen, $(C_1-C_6)$alkyl, halo$(C_1-C_6)$alkyl, cycloalkyl, in particular cyclopentyl, cyclohexyl, phenyl, tolyl or benzyl, or two of the residues R, $R^4$, $R^5$, $R^6$, $R^7$, $R^8$, which are adjacent to each other, form together with the atom, to which they are bound, a ring, wherein this may be unsaturated or saturated, in particular aromatic, unsubstituted or substituted and wherein the carbon chain formed by the respective residues may be disrupted by one or several heteroatoms selected from the group consisting of O, S, N, NH or $N(C_1-C_4)$alkyl;

$R^e$, $R^f$, $R^g$, $R^h$ independently of each other mean hydrogen, alkyl, alkenyl, alkinyl, cycloalkyl, cycloalkenyl, aryl or heteroaryl residues, wherein the 7 residues last mentioned independently of each other may have one or several halogen residues and/or 1 to 3 residues selected from the group consisting of $(C_1-C_6)$alkyl, aryl, heteroaryl, $(C_3-C_7)$cycloalkyl, halogen, $OR^c$, $SR^c$, $NR^cR^d$, $COR^c$, $COOR^c$, $CO—NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other mean hydrogen, $(C_1-C_6)$alkyl, halo$(c_1-c_6)$alkyl, cycloalkyl, in particular cyclopentyl, cyclohexyl, phenyl, tolyl or benzyl.

In a further aspect in a method according to the invention $[B]^{a-}$ is selected from:

fluoride, chloride, bromide, iodide, dicyanamide, thiocyanate, perchlorate, hexafluorophosphate, nitrite, nitrate, sulphate, hydrogen sulphate, carbonate, hydrogen carbonate, alkyl carbonate, methyl carbonate, acrylic carbonate; phosphate; hydrogen phosphate; dihydrogen phosphate; sulfamate $H_2N—SO_3^-$, deprotonated acesulfame (6-methyl-2,2-dioxo-oxathiazine-4-olate), deprotonated saccharine (1,1-dioxo-3-one-1,2-benzothiazolate), cyclamate (deprotonated cyclohexane sulfamic acid), a tetra-substituted borate of the general formula (Va) $[BR^iR^jR^kR^l]^-$, wherein $R^i$ to $R^l$ independently of each other represent fluoro or $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, in particular heteroaryl, wherein the 6 residues last mentioned independently of each other are unsubstituted or substituted by
one or several halogen and/or
1 to 3 residues selected from the group consisting of $(C_1-C_{30})$alkyl, aryl, saturated or unsaturated heterocyclyl, in particular heteroaryl, $(C_3-C_7)$cycloalkyl, halogen, $OR^c$, $SR^c$, $NR^cR^d$, $COR^c$, $COOR^c$, $CO—NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other represent hydrogen, $(C_1-C_6)$ alkyl, halo $(C_1-C_6)$alkyl, cycloalkyl, in particular cyclopentyl, cyclohexyl, phenyl, tolyl or benzyl; or
two of the residues $R^i$ to $R^l$ form together with the boron atom, to which they are bound, a five-, six- or seven-membered ring, wherein this may be saturated or unsaturated, unsubstituted or substituted and wherein the carbon chain formed by the respective carbon atoms may be disrupted by one or several heteroatoms selected from the group consisting of O, S, N, NH or $N—C_1-C_4$-alkyl, or organic sulfonate of the general formula (Vb) $[R^m—SO_3]^-$ or organic sulphate of the general formula (Vc)$[R^m—OSO_3]^-$, wherein $R^m$ represents $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, in particular heteroaryl, wherein the 6 residues mentioned last independently of each other are unsubstituted or substituted by
one or several halogen, and/or
1 to 3 residues selected from the group consisting of $(C_1-C_{30})$alkyl, aryl, saturated or unsaturated heterocyclyl, in particular heteroaryl, $(C_3-C_7)$cycloalkyl, halogen, $OR^c$, $SR^c$, $NR^cR^d$, $COR^c$, $COOR^c$, $CO—NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other represent hydrogen, $(C_1-C_6)$ alkyl, halo$(C_1-C_6)$alkyl, cycloalkyl, in particular cyclopentyl, cyclohexyl, phenyl, tolyl or benzyl;

carboxylate of the general formula (Vd) $[R^n—COO]^-$, wherein $R^n$ represents hydrogen or $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, in particular heteroaryl, wherein the 6 residues mentioned last independently of each other are unsubstituted or substituted by
one or several halogen, and/or
1 to 3 residues selected from the group consisting of the group $(C_1-C_{30})$alkyl, aryl, saturated or unsaturated heterocyclyl, in particular heteroaryl, $(C_3-C_7)$cycloalkyl, halogen, $OR^c$, $SR^c$, $NR^cR^d$, $COR^c$, $COOR^c$, $CO—NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^C$ and $R^d$ independently of each other represent hydrogen, $(C_1-C_6)$ alkyl, halo$(C_1-C_6)$alkyl, cycloalkyl, in particular cyclopentyl, cyclohexyl, phenyl, tolyl or benzyl; or carboxylate, which formally is derived by way of deprotonation of one or optionally also several carboxylic acid groups of fruit acids, saccharide acids, amino acids, fatty acids, volatile acids and resin acids or which is conjugated into these acids, respectively;

a (fluoroalkyl)fluorophosphate of the general formula (Ve) $[PF_x(C_yF_{2y+1-z}H_z)_{6-x}]^-$, wherein $1 \leq x \leq 6$, $1 \leq y \leq 8$ and $0 \leq z \leq 2y+1$; or an imide of the general formulae (Vf) [R°—SO$_2$—N—SO$_2$—R$^p$]$^-$, (Vg) [R$^q$—SO$_2$—N—CO—R$^r$]$^-$ or (Vh) [R$^s$—CO—N—CO—R$^t$]$^-$, wherein R° to R$^t$ independently of each other represent hydrogen or (C$_1$-C$_{30}$) alkyl, (C$_3$-C$_{12}$)cycloalkyl, (C$_2$-C$_{30}$)alkenyl, (C$_3$-C$_{12}$) cycloalkenyl, aryl or saturated or unsaturated heterocyclyl, in particular heteroaryl, wherein the 6 residues mentioned last independently of each other are unsubstituted or substituted by one or several halogen and/or 1 to 3 residues selected from the group consisting of (C$_1$-C$_{30}$)alkyl, aryl, saturated or unsaturated heterocyclyl, in particular heteroaryl, (C$_3$-C$_7$)cycloalkyl, halogen, OR$^c$, SR$^c$, NR$^c$R$^d$, COR$^c$, COOR$^c$, CO—NR$^c$R$^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein R$^c$ and R$^d$ independently of each other represent hydrogen, (C$_1$-C$_6$) alkyl, halo(C$_1$-C$_6$)alkyl, cycloalkyl, in particular cyclopentyl, cyclohexyl, phenyl, tolyl or benzyl;

an organic phosphate of the general formula (Vi) [R$^u$—OPO$_3$]$^{2-}$ or (Vj) [R$^u$O—PO$_2$—OR$^v$]$^-$ or an organic phosphonate of the general formula (Vk) [R$^u$—PO$_3$]$^{2-}$ or (Vl) [R$^u$—PO$_2$—OR$^v$]$^-$, wherein R$^u$ and R$^v$ independently of each other represent hydrogen or (C$_1$-C$_{30}$) alkyl, (C$_3$-C$_{12}$)cycloalkyl, (C$_2$-C$_{30}$)alkenyl, (C$_3$-C$_{12}$) cycloalkenyl, aryl or heteroaryl, wherein the 6 residues mentioned last independently of each other are unsubstituted or substituted by one or several halogen and/or 1 to 3 residues selected from the group consisting of (C$_1$-C$_{30}$)alkyl, aryl, saturated or unsaturated heterocyclyl, in particular heteroaryl, (C$_3$-C$_7$)cycloalkyl, halogen, OR$^c$, SR$^c$, NR$^c$R$^d$, COR$^c$, COOR$^c$, CO—NR$^c$R$^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein R$^c$ and R$^d$ independently of each other represent hydrogen, C$_1$-C$_6$-alkyl, C$_1$-C$_6$-halogenalkyl, cyclopentyl, cyclohexyl, phenyl, tolyl or benzyl.

Examples of fruit acids may in particular be oxalic acid, benzoic acid, salicylic acid, citric acid, tartaric acid, ascorbic acid, lactic acid and malic acid.

Examples of saccharic acids may in particular be uronic acids and onic acids such as, e.g., linear and also cyclic tetronic acids, tetruronic acids, pentonic acids, penturonic acids, hexonic acids, hexuronic acids, in particular gluconic acids, glucuronic acids, or protonated anions, respectively, of gluconate, glucoronate, mannonate, mannuronate, galatonate, galacturonate, fructonate, fructuronate, xylonate and similar.

Examples of amino acids or natural amino acids, respectively, may in particular be alanine, arginine, asparagine, aspartic acid, cysteine, glutamine, glutaminic acid, glycine, histidine, isoleucine, leucine, lysine, methionine, phenylalanine, proline, serine, threonine, tryptophane, tyrosine and valine.

In particular, the fatty acids may be monocarboxylic acids having one to 26 carbon atoms (C1 to C26), wherein the fatty acids may be unsaturated, saturated or mixtures of saturated and/or unsaturated fatty acids. Examples of fatty acids may be alkyl carboxylic acids, alkene carboxylic acids, alkadienyl carboxylic acids, in particular formic acid, acetic acid, propionic acid, acrylic acid, methacrylic acid, butyric acid, isobutyric acid, valeric acid, crotonic acid, caproic acid, caprylic acid, capric acid, pelargonic acid, lauric acid, myristic acid, palmitic acid, margaric acid, arachic acid, behenic acid, palmitoleic acid, oleic acid, elaidic acid, vaccenic acid, eicosenic acid, cetoleic acid, linolenic acid, linoleic acid, sorbic acid and similar.

In a particular aspect in a method according to the present invention, the anion [B]$^{a-}$ is a complex of a central metal atom M$^{+v}$ of the ordination number v=1,2,3,4,5 or 6 and ligands X$^-$, e.g., a complex of the general formula [M$^{+v}$X$_{v+1}$]$^-$ (Vm) or [M$^{+v}$X$_{v+2}$]$^{2-}$(Vn) or [M$^{+v}$X$_{v+3}$]$^{3-}$(Vo), wherein M$^{+v}$ is selected from the elements of the transition metals, in particular selected from the elements Ag, Al, Ce, Cs, Cr, Co, Cu, Dy, Er, Eu, Gd, Ho, Ir, Fe, Mn, Mo, Nd, Ni, Pt, Pr, Re, Rh, Rb, Ru, Sm, Sn, Ta, Tb, Tm, Ti, W, V and Y, in particular preferred in the oxidation states Ag$^+$, Al$^{+3}$, Ce$^{+2}$, Ce$^{+3}$, Ce$^{+4}$, Cs$^{+1}$, Cr$^{+2}$, Cr$^{+3}$, Cr$^{+6}$, Co$^{+2}$, Co$^{+3}$, Cu$^{+1}$, Cu$^{+2}$, Dy$^{+3}$, Er$^{+2}$, Eu$^{+3}$, Eu$^{+3}$, Gd$^{+2}$, Gd$^{+3}$, Ho$^{+2}$, Ho$^{+3}$, Ir$^{+4}$, Fe$^{+2}$, Fe$^{+3}$, Mn$^{+2}$, Mn$^{+3}$, Mo$^{+2}$, Mo$^{+3}$, Mo$^{+4}$, Mo$^{+5}$, Nd$^{+2}$, Nd$^{+3}$, Ni$^{+2}$, Ni$^{+3}$, Pt$^{+4}$, Pr$^{+2}$, Pr$^{+3}$, Re$^{+4}$, Re$^{+5}$, Re$^{+6}$, Rh$^{+2}$, Rh$^{+3}$, Rb$^{+4}$, Ru$^{+3}$, Ru$^{+4}$, Sn$^{+2}$, Sn$^{+4}$, Sm$^{+2}$, Sm$^{+3}$, Ta$^{+5}$, Tb$^{+3}$, Tm$^{+3}$, Ti$^{+2}$, Ti$^{+3}$, W$^{+4}$, W$^{+5}$, V$^{+2}$, V$^{+3}$, V$^{+4}$, V$^{+5}$, Y$^{+2}$ and Y$^{+3}$, wherein each individual of the ligands X is independently of each other selected in particular from: fluoride, chloride, bromide, iodide, thiocyanate, dicyanamide, nitrite; nitrate; acetyl acetone; acyl; adenine; 2,2'-azobisisobutyronitrile; alanine; allyl; allyloxycarbonyl; water; aryl; arginine; asparagine; aspartate; BIABN; biotinyl; 2,2'-bis(diphenyl-phosphino)-6,6'-dimethoxy-1,1'-biphenyl; 2,2'-binaphtyldiphenyldiphosphine; 1,2-bis[4,5-dihydro-3H-binaphtho[1,2-c:2',1'-e]phosphepino]benzol; 1,1'-bis{4,5-dihydro-3H-dinaphtho[1,2-c:2',1'-e]phosphepino}ferrocene; 4,4'-di-tert-butyl-4,4',5,5'-tetrahydro-3,3'-bis-3H-di-naphtho[2,1-c:1',2'-e] phosphepine; BINAL; 4,5-dihydro-3H-dinaphtho[2,1-c;1',2'-e]phosphepine; 2,2'-binaphtyldiol; bis-tert-butyl-bipyridine; benzylmethylphenylphosphine; benzyl; tert-butoxycarbonyl; bis(2-((S)-4-iso-propyl-4,5-dihydrooxazol-2-yl)phenyl)amine; bis(2-((S)-4-tert-butyl-4,5-dihydrooxazol-2-yl)phenyl)amine; 1,2-bis(2,5-diethyl-phospholano)-ethane; butoxy-carbonyl-4-diphenylphosphino-2-diphenylphosphino-methyl-pyrrolidine; 2,2'-bipyridin; benzoyl; benzyloxycarbonyl; CO; cycloheptatrienyl; citrulline; citrate; cyanide; cyclooctadiene; cyclooctatetraene; cyclopentadienyl; pentamethylcyclopentadienyl; cyclohexyl; cytidine; cysteine; cytosine; dibenzilidenacetone; O-isopropylidene-2,3-dihydroxy-1,4-bis(diphenylphosphino)butane; (1R,2R)-bis[(2-methoxyphenyl)phenyl-phosphino]ethane; 4-dimethylamino pyridine; dimethylglyoxim dipivaloyl methanate; Dess-Martin periodinane; 1,4,7,10-tetraaza-cyclododecane-1,4,7,10-tetraacetate; diphenylphosphenyl ethane; diphenylphosphenyl methane; diphenylphosphenyl propane; desoxy ribose; diethylentriamine-pentaacetate; bis(2,5-dimethylphospholano)-benzene; ethylene diamintetraacetate; ethylene diamine; fluorenyl methoxycarbonyl; 7,7-dimethyl-1,1,1,2,2,3,3-heptafluorooctan-4,6-dionato; galactose; galactosamine; N-acetylgalactosamine, glycolyl; glucose; glucosamine, N-acetyl-glucosamine, glutamine, glutamate, glycine, guanine; guanosine; haemoglobin;

hexafluoroacetyl acetonate; histidine; hexamethyl phosphoric acid triamide; hydroxyproline; isoleucine; leucine; lysine; 2,2'-bis[(N,N-dimethylamino)(phenyl)methyl]-1,1'-bisdicyclohexyl-phosphino)ferrocene; myoglobin; methionine; methaemoglobin; metmyoglobin; 3,5-dioxa-4-phosphacyclohepta[2,1a;3,4-a']dinapthalene-4-yl)dimethylamine; methylphenyl-propyl phosphine; methylsulfone; bicyclo[2.2.1]hepta-2,5-; neuraminic acid; N-acetyl-neuraminic acid; N-glycolyl-neuraminic acid; 2,3-bis(diphenylphosphino)bicyclo[2.2.1]hept-5-ene; nitrilo-triacetic acid; ornithine; succinate; oxalate; phenyl o-anisylmethyl phosphine; phthalo cyanine; phenyl alanine; phenanthroline; picolyl amine; piperidine; para-nitro-benzoic acid; porphyrin; proline; pyridyl; PYBOX; pyroglutamate; pyrazine; ribose; sarcosine; salene; serine; succinyl; 1,4,7-triazacyclononane; tert-butyl-di-methyl-silyl; tartrate; terpyridine; thymidine; threonine; thymine; tetramethylethylene diamine; trimesic acid; tris(pyrazolyl)borate; triphenyl phosphane; tryptophane; tyrosine; tetrazole; ubiquitin; uracil; uridine; valine.

In a method according to the invention in a particular aspect, defined, carbon containing, organic, saturated or unsaturated, acyclic or cyclic, aliphatic, aromatic or araliphatic residues contain 1 to 30 carbon atoms, the residues $R^i$ to $R^l$ at the tetra-substituted borate (Va), the residue $R^m$ at the organic sulfonate (Vb) and sulphate (Vc), the residue $R^n$ at the carboxylate (Vd), the residues $R^o$ to $R^t$ at the (fluoroalkyl)fluorophosphate (Ve), the imides (Vf), (Vg) and (Vh), the residues $R^u$ and $R^v$ at the organic phosphates (Vi), (Vj) and the organic phosphonates (Vk), (Vl) independently of each other preferably mean:

($C_1$-$C_{30}$)alkyl and the aryl-, heteroaryl-, cycloalkyl-, halogen-, hydroxy-, amino-, carboxy-, formyl-, —O—, —CO—, —CO—O— or —CO—N< substituted components thereof, in particular methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_nF_{2(n-a)+(1-b)}H_{2a+b}$ with n≤30, 0≤a≤n and b=0 or 1 (for example, $CF_3$, $C_2F_5$, $CH_2CH_2$—$C_{(n-2)}F_{2(n-2)+1}$, $C_6F_{13}$, $C_8F_{17}$, $C_{10}F_{21}$, $C_{12}F_{25}$);

($C_3$-$C_{12}$)cycloalkyl and the aryl-, heteroaryl-, cycloalkyl-, halogen-, hydroxy-, amino-, carboxy-, formyl-, —O—, —CO— or —CO—O-substituted components thereof, such as, e.g., cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_nF_{2(n-a)-(1-b)}H_{2a-b}$ with n≤30, 0≤a≤n and b=0 or 1;

($C_2$-$C_{30}$)alkenyl and the aryl-, heteroaryl-, cycloalkyl-, halogen-, hydroxy-, amino-, carboxy-, formyl-, —O—, —CO— or —CO—O-substituted components thereof, in particular 2-propenyl, 3-butenyl, cis-2-butenyl, trans-2-butenyl or $C_nF_{2(n-a)-(1-b)}H_{2a-b}$ with n≤30, 0≤a≤n and b=0 or 1;

($C_3$-$C_{12}$)cycloalkenyl and the aryl-, heteroaryl-, cycloalkyl-, halogen-, hydroxy-, amino-, carboxy-, formyl-, —O—, —CO— or —CO—O-substituted components thereof, in particular 3-cyclopentenyl, 2-cyclohexenyl, 3-cyclohexenyl, 2,5-cyclohexadienyl or $C_nF_{2(n-a)-3(1-b)}H_{2a-3b}$ with n≤30, 0≤a≤n and b=0 or 1;

aryl or saturated or unsaturated heterocyclyl, in particular heteroaryl having 2 to 30 carbon atoms and the alkyl-, aryl-, heteroaryl-, cycloalkyl-, halogen-, hydroxy-, amino-, carboxy-, formyl-, —O—, —CO— or —CO—O-substituted components thereof, in particular phenyl, 2-methyl-phenyl (2-tolyl), 3-methyl-phenyl (3-tolyl), 4-methyl-phenyl, 2-ethyl-phenyl, 3-ethyl-phenyl, 4-ethyl-phenyl, 2,3-dimethyl-phenyl, 2,4-dimethyl-phenyl, 2,5-dimethyl-phenyl, 2,6-dimethyl-phenyl, 3,4-dimethyl-phenyl, 3,5-dimethyl-phenyl, 4-phenyl-phenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ with 0≤a≤5.

In a method according to the present invention $[B]^{a-}$ is preferably fluoride, chloride, dicyanamide, thiocyanate; nitrate, sulphate, hydrogen sulphate, methyl carbonate, phosphate; hydrogen phosphate; dihydrogen phosphate; sulfamate, $H_2N$—$SO_3^-$.

If the anion $[B]^{a-}$ is a tetra-substituted borate (Va), then therein preferably all four residues $R^i$ to $R^l$ are identical, wherein these preferably represent fluorine, trifluoromethyl, pentafluoroethyl, phenyl, 3,5-bis(trifluoromethyl)phenyl. Especially preferred tetra-substituted borates (Va) having four identical residues are tetrafluoroborate, tetraphenyl borate and tetra[3,5-bis(trifluoromethyl)phenyl]borate; or it is also preferably a tetra-substituted borate (Va) having four oxygen atoms directly bound to the boron atom, which are connected in pairs with saturated or unsaturated C2 to C4 alkyl- or alkenyl chains, respectively, which may be substituted or unsubstituted or to which, in the case of the alkenyl chains, an aromatic ring may be annulated, hence forming two identical or different five-, six- or seven-membered rings, preferably bis(mandelato)borate, bis(salicylato)borate, bis(oxalato)borate, bis(glycolato)borate, bis(malonato)borate, bis(succinato)borate, bis(maleinato)borate, bis(catecholato)borate (the deprotonated reaction products of the boric acid with mandelic acid, salicylic acid, oxalic acid, glycolic acid, malonic acid, succinic acid, maleic acid, benzene-1,2-diol).

If the anion $[B]^{a-}$ is an organic sulfonate (Vb) or sulphate (Vc), the residue $R^m$ preferably represents methyl, trifluoromethyl, pentafluoroethyl, p-tolyl or $C_9F_{19}$. Especially preferred organic sulfonates (Vb) are trifluoromethane sulfonate (triflate), methane sulfonate, nonadecafluorononansulfonate (nonaflate) and p-toluene sulfonate; especially preferred organic sulphates (Vc) are methyl sulphate, ethyl sulphate, n-propyl sulphate, i-propyl sulphate, butyl sulphate, pentyl sulphate, hexyl sulphate, heptyl sulphate, octyl sulphate, nonyl sulphate and decyl sulphate as well as n-alkyl sulphates having longer chains; benzyl sulphate, alkylaryl sulphate.

If the anion $[B]^{a-}$ is a carboxylate (Vd), the residue $R^n$ preferably represents hydrogen, trifluoromethyl, pentafluoroethyl, phenyl, hydroxyphenyl methyl, trichloromethyl, dichloromethyl, chloromethyl, trifluoromethyl, difluoromethyl, fluoromethyl or unbranched or branched $C_1$- to $C_{12}$-alkyl, such as, for example, methyl, ethyl, 1-propyl, 2-propyl, 1-butyl, 2-butyl, 2-methyl-1-propyl (isobutyl), 2-methyl-2-propyl (tert.-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl.

Especially preferred carboxylates (Vc) are formiate, acetate, propionate, butyrate, valeriate, benzoate, mandelate, trichloroacetate, dichloroacetate, chloroacetate, trifluoroacetate, difluoroacetate, fluoroacetate. Further especially preferred carboxylates (Vc) are such, which formally are formed by deprotonation of the following acids and, hence, are conjugated into these: oxalic acid, benzoic acid, salicylic acid, citric acid, tartaric acid, ascorbic acid, lactic acid, succinic acid, sulfosuccinic acid, sulfosuccinic acid mono- or dialkyl esters—e.g., sulfosuccinic-bis-2-ethylhexyl ester, gluconic acids, glucuronic acids, mannonic acids, mannuronic acids, galactonic acids, galacturonic acids, fructonic acids, fructuronic acids, xylonic acids, alanine, arginine, asparagine, aspartic acid, cysteine, glutamine, glutaminic acid, glycine, histidine, isoleucine, leucine, lysine, methionine, phenylalanine, proline, serine, threonine, tryptohane, tyrosine, valine, saturated and/or unsaturated fatty acids and mixtures thereof having one to 26 carbon atoms (C1 to C26), e.g., acrylic acid, methacrylic acid, isobutyric acid, valeric acid, crotonic acid, capronic acid, caprylic acid, caprinic acid, pelargonic acid, lauric acid, myristic acid, palmitic acid, margaric acid, arachic acid, behenic acid, palmitoleic acid, oleic acid, elaidic acid, vaccenic acid, eicosenic acid, cetoleic acid, linolenic acid, linoleic acid, sorbic acid.

If the anion $[B]^{a-}$ is a (fluoroalkyl)fluorophosphate (Ve) $[PF_x(C_yF_{2y+1-z}H_z)_{6-x}]^-$, then z is preferably 0. Especially preferred are (fluoroalkyl)fluorophosphates (Ve), wherein z=0, x=3 and 1≤y≤4, precisely $[PF_3(CF_3)_3]^-$, $[PF_3(C_2F_5)_3]^-$, $[PF_3(C_3F_7)_3]^-$ and $[PF_3(C_4F_7)_3]^-$.

If the anion $[B]^{a-}$ is an imide (Vf), (Vg) or (Vh), the residues $R^o$ to $R^t$ independently of each other preferably represent hydrogen, trifluoromethyl, pentafluoroethyl, phenyl, trichloromethyl, dichloromethyl, chloromethyl, trifluoromethyl, difluoromethyl, fluoromethyl or unbranched or branched $C_1$- to $C_{12}$-alkyl, such as, e.g., methyl, ethyl, 1-propyl, 2-propyl, 1-butyl, 2-butyl, 2-methyl-1-propyl (isobutyl), 2-methyl-2-propyl (tert.-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl. Especially preferred imides (Vf), (Vg) and (Vh) are $[F_3C—SO_2—N—SO_2—CF_3]^-$, $[F_3C—SO_2—N—CO—CF_3]^-$, $[F_3C—CO—N—CO—CF_3]^-$ and such, wherein the residues $R^o$ to $R^t$ independently of each other represent hydrogen, methyl, ethyl, propyl, butyl, phenyl, trifluoromethyl, difluoromethyl or fluoromethyl.

If the anion $[B]^{a-}$ is an organic phosphate (Vi), (Vj) or an organic phosphonate (Vk), (Vl), the residues $R^u$ and $R^v$ independently of each other preferably represent methyl, ethyl, n-propyl, iso-propyl, butyl, phenyl and p-tolyl. Especially preferred organic phosphates (Vj) are dimethyl phosphate, diethyl phosphate, dibutyl phosphate, bis(2-ethylhexyl) phosphate, diphenyl phosphate, dibenzyl phosphate. Especially preferred organic phosphonates (Vl) are dimethyl phosphonate and diethyl phosphonate.

If the anion $[B]^{a-}$ is a metal complex of the general formula (Vm), (Vn) or (Vo), then $M^{+\nu}$ is particularly preferably selected from the elements Ag, Al, Cr, Co, Cu, Fe, Mn, Mo, Nd, Ni, Sn, Ti, W, V, of the oxidation numbers $Ag^+$, $Al^{+3}$, $Cr^{+2}$, $Cr^{+3}$, $Cr^{+6}$, $Co^{+2}$, $Co^{+3}$, $Cu^{+1}$, $Cu^{+2}$, $Fe^{+2}$, $Fe^{+3}$, $Mn^{+2}$, $Mn^{+3}$, $Mo^{+2}$, $Mo^{+3}$, $Mo^{+4}$, $Mo^{+5}$, $Nd^{+2}$, $Nd^{+3}$, $Ni^{+2}$, $Ni^{+3}$, $Sn^{+2}$, $Sn^{+4}$, $Ti^{+2}$, $Ti^{+3}$, $W^{+4}$, $W^{+5}$, $V^{+2}$, $V^{+3}$, $V^{+4}$ and $V^{+5}$. Each individual one of the ligands X is, independently of each other, especially preferably selected from fluoride, chloride, bromide, iodide, thiocyanate, dicyanamide, acetyl acetone; CO; cyanide; cyclopentadienyl; dimethylglyoxime; ethylene diamintetraacetate; ethylene diamine; succinate; oxalate; porphyrin.

Preferred cations $[A]^+$ are respectively quaternary or protonated ammonium cations $[R^1R^1R^2R^3N]^+$, phosphonium cations $[R^1R^1R^2R^3P]^+$ or guanidinium cations $R^3R^{3'}N(C=NR^1R^{1'})NR^2R^{2'}$ with the residues $R^1, R^{1'}, R^2, R^{2'}, R^3$ und $R^{3'}$, which independently of each other represent hydrogen, linear or branched $(C_1-C_{20})$alkyl, linear or branched $(C_2-C_{20})$alkenyl, in particular vinyl and allyl, cyclohexyl, phenyl, benzyl or tolyl.

Especially preferred therein are $NH_4^+$; guanidinium (protonated guanidine); 1,1,3,3-tetramethyl guanidinium, 1,1,2,3,3-pentamethyl guanidinium, 1,1,2,2,3,3-hexamethyl guanidinium, methyl ammonium, ethyl ammonium, propyl ammonium, butyl ammonium, hexyl ammonium, octyl ammonium, dimethyl ammonium, diethyl ammonium, dipropyl ammonium, dibutyl ammonium, dihexyl ammonium, dioctyl ammonium, diethyl methyl ammonium, dipropylmethyl ammonium, dibutylmethyl ammonium, trimethyl ammonium, triethyl ammonium, tripropyl ammonium, tributyl ammonium, trihexyl ammonium, trioctyl ammonium, diethyldimethyl ammonium, dipropyldimethyl ammonium, dibutyldimethyl ammonium, dihexyldimethyl ammonium, dioctyldimethyl ammonium, triethylmethyl ammonium, tripropylmethyl ammonium, tributylmethyl ammonium, trihexylmethyl ammonium, trioctylmethyl ammonium, trimethylethyl ammonium, trimethylpropyl ammonium, trimethylbutyl ammonium, trimethylhexyl ammonium, trimethyloctyl ammonium, tetramethyl ammonium, tetraethyl ammonium, tetrapropyl ammonium, tetrabutyl ammonium, tetrahexyl ammonium, tetraoctyl ammonium, 2-hydroxyethyl-trimethyl ammonium (cholinium), O-acetylcholinium, tris-(2-hydroxyethyl)-ammonium, tris-(2-hydroxyethyl)-methyl ammonium, tris-(2-hydroxyethyl)-ethyl ammonium, 2-methoxyethyl-trimethyl ammonium (O-methyl-cholinium), tris-(2-methoxyethyl)-ammonium, tris-(2-methoxyethyl)-methyl ammonium, tris-(2-methoxyethyl)-ethyl ammonium, bis-(2-methoxyethyl)-dimethylammonium, triallylmethyl ammonium, trimethyl phosphonium, triethyl phosphonium, tripropyl phosphonium, tributyl phosphonium, trihexyl phosphonium, trioctyl phosphonium, tetramethyl phosphonium, triethylmethyl phosphonium, tripropylmethyl phosphonium, tributylmethyl phosphonium, trihexylmethyl phosphonium, trioctylmethyl phosphonium, tetradecyl(trihexyl)phosphonium, triisobutyl (methyl)phosphonium, ethyl(tributyl)phosphonium, octyl (tributyl)phosphonium, N-decyl-N-methyl pyrrolidinium, N-octyl-N-methyl pyrrolidinium, N-hexyl-N-methyl pyrrolidinium, N-butyl-N- methyl pyrrolidinium, N-propyl-N-methyl pyrrolidinium, N-ethyl-N-methyl pyrrolidinium, N,N-dimethyl pyrrolidinium, N-allyl-N-methyl pyrrolidinium, N-decyl-pyrrolidinium, N-octyl-pyrrolidinium, N-hexyl-pyrrolidinium, N-butyl-pyrrolidinium, N-propyl-pyrrolidinium, N-ethyl-pyrrolidinium, N-methylpyrrolidinium, N-allyl-pyrrolidinium, pyrrolidinium (protonated tetrahydro pyrrol), N-decyl-N-methyl morpholinium, N-octyl-N-methyl morpholinium, N-hexyl-N-methyl morpholinium, N-butyl-N-methyl morpholinium, N-propyl-N-methyl morpholinium, N-ethyl-N-methyl morpholinium, N,N-dimethyl morpholinium, N-allyl-N-methyl morpholinium, N-decyl-morpholinium, N-octyl-morpholinium, N-hexyl-morpholinium, N-butyl-morpholinium, N-propyl morpholinium, N-ethyl morpholinium, N-methyl morpholinium, N-allyl-morpholinium, morpholinium (protonated 1,4-oxazinane), N-decyl-N-methyl piperidinium, N-octyl-N-methyl piperidinium, N-hexyl-N-methyl piperidinium, N-butyl-N-methyl piperidinium, N-propyl-N-methyl piperidinium, N-ethyl-N-methyl piperidinium, N,N-dimethyl piperidinium, N-allyl-N-methylpiperidinium, N-decyl-piperidinium, N-octyl-piperidinium, N-hexyl-piperidinium, N-butyl-piperidinium, N-propyl-piperidinium, N-ethyl-piperidinium, N-methylpiperidinium, N-allyl-piperidinium, piperidinium (protonated hexahydropyridine).

Especially preferred are further imidazolium (protonated 1,3-diazol), 1-methyl-imidazolium, 1,2-dimethyl imidazolium, 1-ethyl-imidazolium, 1-vinyl imidazolium, 1-propyl-imidazolium, 1-iso-propyl-imidazolium, 1-allyl-imidazolium, 1-butyl-imidazolium, 1-ethyl-2-methyl imidazolium, 1-butyl-2-methylimidazolium, 1-hexyl-imidazolium, 1-octyl-imidazolium, 1,3-dimethyl-imidazolium, 1,2,3-trimethyl imidazolium, 1-ethyl-3-methyl-imidazolium, 1-vinyl-3-methyl-imidazolium, 1-vinyl-2,3-dimethyl-imidazolium, 1-butyl-3-methyl imidazolium, 1-propyl-3-methyl imidazolium, 1-iso-propyl-3-methyl imidazolium, 1-allyl-3-methyl imidazolium, 1-propyl-2,3-dimethyl imidazolium, 1-iso-propyl-2,3-dimethyl imidazolium, 1-allyl-2,3-dimethyl imidazolium, 1-ethyl-2,3-dimethyl imidazolium, 1-butyl-2,3-dimethyl imidazolium, 1-hexyl-3-methyl imidazolium, 1-octyl-3-methyl imidazolium, 1-decyl-3-methyl imidazolium, 1,3-diethyl imidazolium, 1,3-dibutyl imidazolium.

Further preferred are the protonated forms of the strong bases 1,5-diazabicyclo[4.3.0]non-5-ene (DBN); 1,8-diazabicyclo[5.4.0]undec-7-ene (DBU); 1,4-diazabicyclo-[2.2.2]-octane (DABCO®); 1,8-bis-(dimethylamino)-naphtaline (Proton Sponge®); N,N,N',N'-tetramethylethylene diamine (TMEDA); 4,5-bis-(dimethyl-amino)-fluorene; 1,8-bis-(hexamethyltriamino phosphazenyl)naphthaline.

To the ionic liquids described there may further be added in a method according to the invention 5-95 wt. % metal salts $[M]_x^{b+}[B]_y^{a-}$, wherein a, b, x, y independently of each other represent the integers 1, 2, 3 or 4 and wherein the product of x and b equals the product of y and a. Preferred metal cations therein are $Cr^{+2}$, $Cr^{+3}$, $Co^{+2}$, $Co^{+3}$, $Cu^{+1}$, $Cu^{+2}$, $Fe^{+2}$, $Fe^{+3}$, $Mn^{+2}$, $Mn^{+3}$, $Ni^{+2}$, $Ni^{+3}$, $Ti^{+2}$, $Ti^{+3}$, $Li^+$, $Na^+$, $K^+$, $Cs^+$, $Mg^{2+}$, $Ca^{2+}$, $Ba^2$, $Sr^{2+}$, $Zr^{4+}$, $Sn^{2+}$, $Sn^{4+}$, $Ag^+$, $Zn^{2+}$ and $Al^{3+}$, especially preferred ones being $Co^{+2}$, $Co^{+3}$, $Cu^{+1}$, $Cu^{+2}$, $Fe^{+2}$, $Fe^{+3}$, $Mn^{+2}$, $Mn^{+3}$, $Ti^{+2}$, $Ti^{+3}$, $Li^+$, $Na^+$, $K^+$, $Mg^{2+}$, $Ca^{2+}$, $Zn^{2+}$ and $Al^{3+}$.

Ionic liquids are—in the sense of acknowledged literature (e.g., Wasserscheid, Peter; Welton, Tom (Eds.); "Ionic Liquids in Synthesis", Verlag Wiley-VCH 2003; ISBN 3-527-30515-7; Rogers, Robin D.; Seddon, Kenneth R. (Eds.); "Ionic Liquids—Industrial Applications to Green Chemistry", ACS Symposium Series 818, 2002; ISBN 0841237891")—liquid organic salts or salt mixtures consisting of organic cations and organic or inorganic anions having melting points of below 100° C. In these salts, there may be dissolved in addition inorganic salts and further also molecular adjuvants. In the sense of this application, the arbitrarily chosen limit of the melting point of ionic liquids of 100° C. is considered in a wider sense, thus also including molten salts having a melting point well above 100° C. but below 200° C. Apart from that, they do not differ in their characteristics. Ionic liquids have extraordinarily interesting characteristics such as, e.g., a very low to not measurable vapour pressure, a very high liquidus range, good electrical conductivity as well as unusual solvation characteristics. These characteristics predestine for being used in various fields of technical applications. They may, for example, be used as solvents (for the organic and inorganic synthesis in general, in the transition metal catalysis, the bio-catalysis, the phase transfer catalysis, in multi-phase reactions, in photochemistry, in the polymer synthesis and the nano-technology), as extraction agents (in the liquid-liquid and liquid-gaseous extraction in general, the desulfurization of raw oil, the removal of heavy metals from waste waters, the liquid membrane extraction), as electrolytes (in batteries, fuel cells, capacitors, solar cells, sensors, for the Galvano technique, in the electro-chemical metal processing, in the electro-chemical synthesis in general, in the electro-organic synthesis, in the nano-technology), as lubricants, as thermal fluids, as gels, as reagents for the organic synthesis, in the "Green Chemistry" (substitute for volatile organic compounds"), as anti-static agents, in special applications of analytics (gas chromatography, mass spectroscopy, capillary electrophoresis), as liquid crystals etc. In the use of ionic liquids, the optimization of the characteristics for the respective application may be realized within wider boundaries due to a variation of the structure of anion and cation or a variation of the combination thereof, respectively, which has resulted in the ionic liquids being in general referred to as "designer solvents" (see, e.g., Freemantle, M.; Chem. Eng. News, 78, 2000, 37).

As ionic liquids consist of organic cations and organic or inorganic anions, they have a high concentration of charge carriers and, hence, are electrically conductive. Ionic liquids, for this reason, are extraordinarily good microwave recipients (see Martínez-Palou R., *Molecular Diversity* (2010), 14, (1), 3-25 and Morris R. E., *Angewandte Chemie, International Edition* (2008), 47, (3), 442-444) having an extremely high absorption coefficient over a very wide frequency range.

There has surprisingly been found that these excellent characteristics, in spite of the in general high to very high viscosity of a typical adhesive formulation, will be conserved before and during the adhesion process, if ionic liquids are being added to the adhesive formulation. There has further been found that even ionic liquids having large organic ions—and thus a reduced density of charge carriers—will absorb only insignificantly less than such having small ions and a higher density of charge carriers. Ionic liquids, hence, may be readily chemically functionalized, wherein in particular functionalities are interesting, which are identical or analogous to those of the adhesive, so that the functionalized ionic liquids will bind into the cured adhesive matrix, thus being nor "filler" but rather part of the matrix. There has further been found that already small quantities of added ionic liquid are sufficient to impart excellent microwave coupling characteristics to the adhesive, as a rule sufficing already a few mass weight percent for this purpose.

By way of the examples below, special embodiments of the invention will be described in greater detail.

EXAMPLES

Example 1

3 gram of the two ionic liquids 1-ethyl-3-methylimidazolium-methane sulfonate ("EMIM-MeSO$_3$", CAS 145022-45-3, molar mass 206.3 g/mol) and methyltrioctyl ammonium-methane sulfonate ("TOMA-MeSO$_3$", CAS 84679-79-8, molar mass 463.8 g/mol) were irradiated, using vigorous stirring, in a 10 ml quartz microwave container at 2.45 GHz and a constant power of 10 W and 50 W using microwaves in an Anton Paar Monowave 300. By means of a fibre-optical probe, the temperature course was measured, wherein the results shown in FIG. 1 were obtained.

Figure 1:
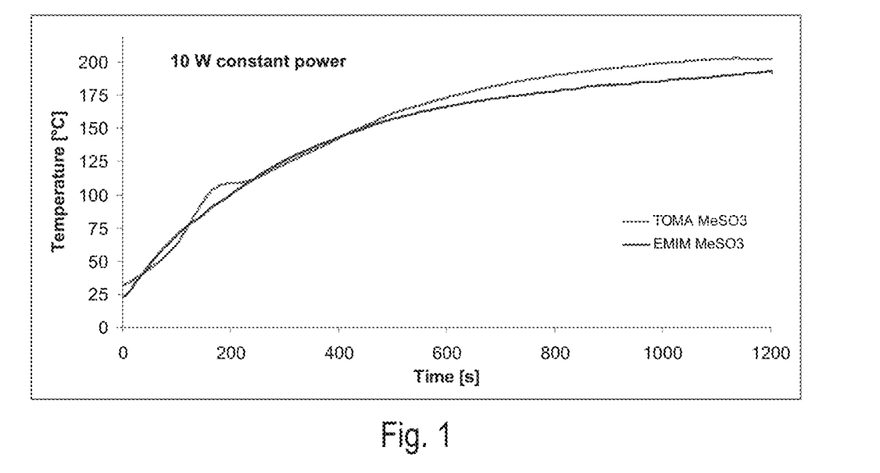
FIG. 1 shows the temperature course of ionic liquids 1-ethyl-3-methylimidazolium-methane sulfonate (EMIM-MeSO$_3$) and methyltrioctyl ammonium-methane sulfonate (TOMA-MeSO$_3$) during irradiation at 10 W microwave power.

In FIG. 1 there is shown the result of the irradiation of respectively 3 g EMIM-MeSO$_3$ and TOMA-MeSO$_3$ at 10 W microwave power. The upper curve relates to TOMA-MeSO$_3$, with the lower one relating to EMIM-MeSO$_3$.

Figure 2:
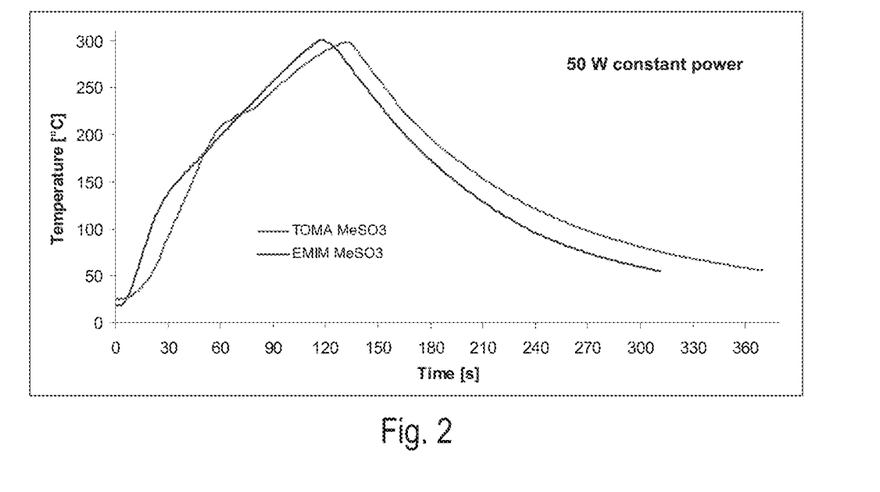
FIG. 2 shows the temperature course of ionic liquids EMIM-MeSO$_3$ and TOMA-MeSO$_3$ during irradiation at 50 W microwave power.

In FIG. 2 there is shown the result of the irradiation of respectively 3 g EMIM-MeSO$_3$ and TOMA-MeSO$_3$ at 50 W microwave power, wherein upon reaching 300° C. irradiation was stopped. The left curve relates to EMIM-MeSO$_3$, with the one to the right relating to TOMA-MeSO$_3$.

Whereas EMIM-MeSO$_3$ is an ionic liquid well-soluble in water having an aromatic cation and rather low viscosity (11 mPas@100° C.), TOMA-MeSO$_3$ is purely aliphatic, hydrophobic and shows—i.e. also due to the large molar mass—a significantly higher viscosity (83 mPas@100° C.). As can be seen in FIG. 1 and FIG. 2, both ionic liquids, in spite of the large difference of the molar masses and viscosities thereof, show the nearly identical excellent microwave coupling behaviour, which, hence, is hardly dependent on the density of the charge carriers and the structure of the cations.

Example 2

Figure 3:
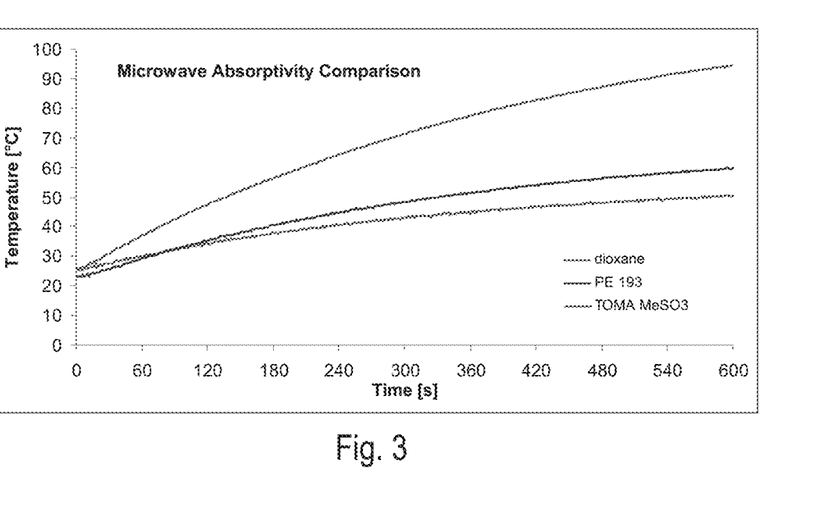
FIG. 3 shows heating profiles of three samples irradiated at a constant power of 50 W with microwaves: 1) 3 ml 1,4-dioxane; 2) 100 mg PE193 (a polybutadiene having 30 wt. % carbon particles) as a fine powder, suspended in 3 ml 1,4-dioxane; 3) 5 mg TOMA-MeSO$_3$ dissolved in 3 ml 1,4-dioxane.

The following three samples were irradiated under the same conditions as in the experiment 1 at a constant power of 50 W with microwaves:
1. 3 ml 1,4-dioxane
2. 100 mg PE193 (a polybutadiene having 30 wt. % carbon particles) as a fine powder, suspended in 3 ml 1,4-dioxane;
3. 5 mg TOMA-MeSO$_3$ dissolved in 3 ml 1,4-dioxane The 1,4-dioxane, in this connection, served as a somewhat microwave-transparent solvent or suspension medium, respectively, which is able to dissolve ionic liquids. FIG. 3 shows the heating profiles of the three samples: the solvent 1,4-dioxane as well as the polymer to which carbon particles were added show moderate microwave coupling. In comparison with the 30 mg carbon particles contained in the polymer, only 5 mg of the ionic liquid TOMA-MeSO$_3$, however, show a completely different behaviour, leading to significantly faster heating. This is visible from FIG. 3, which shows a comparison of the heating profiles of a polymer to which carbon particles (carbon black) have been added and an ionic liquid. The uppermost curve is assigned to the TOMA-MeSO$_3$, with the middle curve being assigned to the Pe 193 and the lowermost to the dioxane.

Example 3

Figure 4:
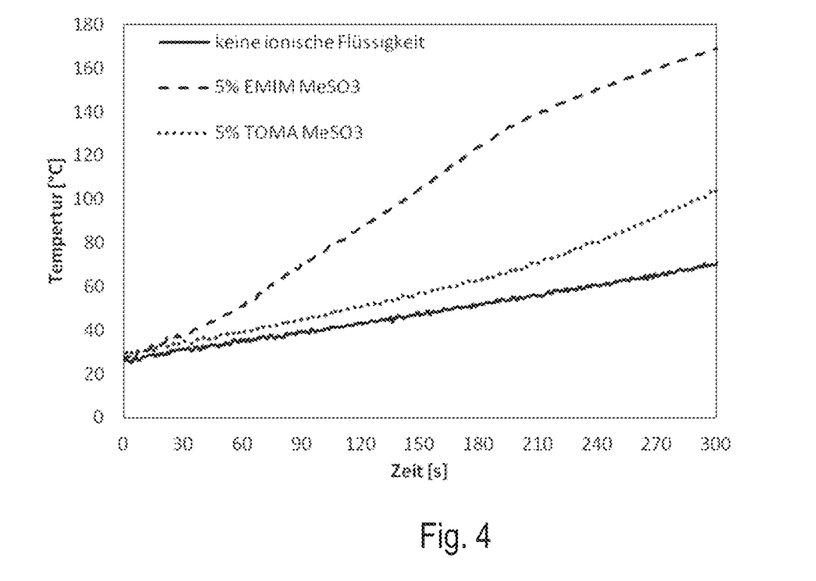
FIG. 4 shows heating profiles of liquid samples each comprising a hot melt adhesive and an ionic liquid.

A commercially available hot melt adhesive ("UHU Klebepatronen", article number 47865, UHU GmbH & Co. KG) was liquefied at 200° C. in the drying cabinet and homogenously mixed with 5 wt. % of the same ionic liquid as described in example 1 (EMIM MeSO$_3$ and TOMA MeSO$_3$). The liquid samples were filled into cylindrical 10 mL-microwave containers and again cooled to room temperature. Then the samples were irradiated in a single-mode microwave device (Monowave 300, Anton Paar GmbH) at a constant microwave power of 50 W for a period of 5 min, the temperature was measured at the external wall of the microwave containers using an IR sensor. In FIG. 4, there are illustrated the heating profiles of the individual irradiation experiments: after 5 minutes, the temperatures measured at the container wall were 70° C. (untreated hot melt adhesive), 170° C. (5 wt. % EMIM MeSO$_3$) and 105° C. (5 wt. % TOMA MeSO$_3$). Although the hot melt adhesive may also be heated without any additives using microwave irradiation, it is, however, clearly visible that the addition of ionic liquids will lead to significantly higher heating rates. In the case of EMIM MeSO$_3$, which is present as a liquid at room temperature, the heating rates are even faster than with TOMA MeSO$_3$, which will only beginning to melt at about 60° C. As soon as TOMA MeSO$_3$ is molten, also the heating rate of this mixture will increase (see heating profile of TOMA MeSO$_3$ in FIG. 4). Samples, which have been exposed to microwave irradiation, will be heated due to direct interaction with the microwave field ("in-core heating"), leading to the sample being heated from the inside towards the outside. With conventional heating, the introduction of heat will be realized via an external heating source initially onto the sample container and only then onto the sample to be heated. For this reason, there is to be assumed that the temperature, which is measured at the external wall using an IR sensor, may only reflect the actual temperature conditions in a time-delayed way, with the temperature being higher inside than outside at the container wall. Following the tests using microwave, the three samples were again conventionally liquefied at 200° C. in the drying cabinet, and there were performed adhesion tests using glass (commercially available specimen slides for optical microscopy) and paper (commercially available photocopying paper), wherein there were respectively applied some drops of the liquid hot melt adhesive between two layers of the sample materials, pressure was applied manually onto the sample materials (pressing) and several minutes had to be waited to obtain cooling. The haptically detectable adhesive power of the hot melt adhesive treated with ionic liquid did not show a difference in comparison with the un-treated original sample.

Example 4

Figure 5:
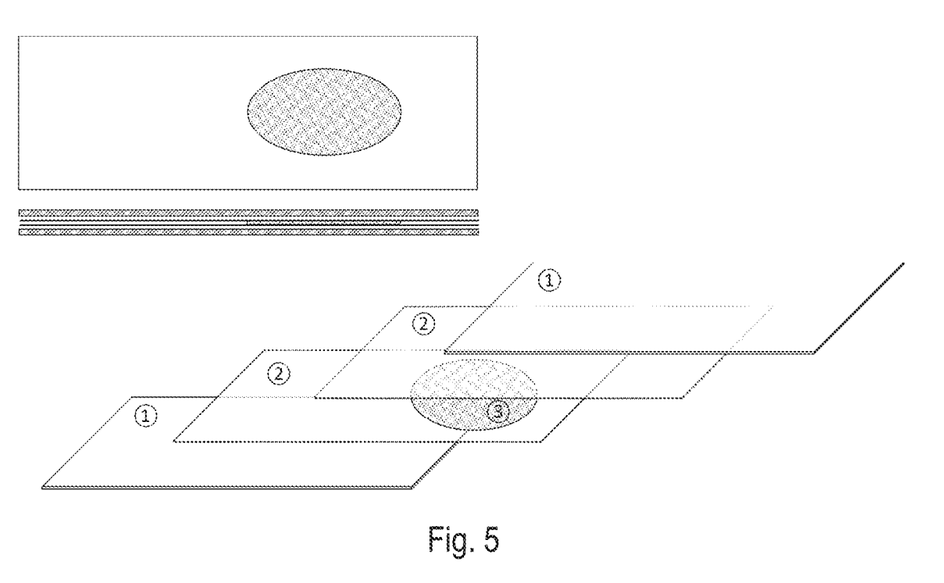
FIG. 5 shows a schematic illustration of a test set-up for testing microwave-induced welding of thermoplastic materials by means of ionic liquids.

In order to examine the microwave-induced welding of thermoplastic materials by means of ionic liquids, there were used commercially available vacuum seal foils, as they are used, for example, for packaging foodstuff under vacuum (thermal vacuum seals, "vacuuming"). For this purpose, there was introduced a droplet of EMIM MeSO$_3$ between two foil parts (75×25 mm) and fixed between microwave-transparent glass plates in order to impregnate a certain contact pressure and to ensure the foils contacting each other. The schematic illustration of the test set-up is illustrated in FIG. 5 (①glass plates, ②thermoplastic foils, ③EMIM MeSO$_3$). The system to be irradiated was irradiated in a home microwave device commercially available (Samsung ME711K, Samsung Electronics U.K. Ltd.), which is operated at a frequency of 2450 MHz. The microwave power of the device may be freely selected between 100 and 800 in increments, with a rotating plate internally arranged in the 20 L-cavity ensuring a rather homogenous distribution of the microwave irradiation onto the samples. In a first test procedure, the foil parts were brought into contact without any ionic liquid between the two glass plates and irradiated at a magnetron power of 800 W for 150 s seconds. It was possible to determine that the thermoplastic foils were not molten into one another, although the irradiated system as a whole was slightly heated. In a further test procedure, as depicted in FIG. 5, a droplet of EMIM $MeSO_3$ was introduced in-between the two foils, which were brought into contact by the two glass plates and which were irradiated for 30 s at the same microwave power as before (800 W). Following irradiation, the thermoplastic foils had molten into one another at exactly that area where the droplets of ionic liquid had been applied onto before. It is, hence, possible to heat the droplet of the ionic liquid within a very short period of time selectively so significantly so that the two foil parts will weld into one another. Those areas of the thermoplasts, onto which no EMIM $MeSO_3$ had been applied, remained unchanged, this is they did not melt into one another.

As it is, hence, possible, to heat the adhesive area selectively and extremely fast and more or less "on the spot" without having to heat the adhesive, microwave-transparent material, it is possible to glue such materials together, which would not tolerate the high temperatures mentioned.

In contrast to the particle-based materials absorbing microwaves, large amounts in the range of several 10% no longer have to be added, and amounts in the range of 0.01-15 wt. %, preferably of 0.01-5 wt. % are sufficient.

As the majority of the ionic liquids is colourless to yellowish and may be included in a homogenous phase, they will not interfere with the optical appearance, in contrast to the mostly black particles.

Suitable ionic liquids may be chemically functionalized, wherein in particular those functionalities are interesting, which are identical or analogous to those of the adhesive monomers, so that the functionalized ionic liquid will bind into the cured adhesive matrix, thus being no "filler" but rather part of the matrix and contributing to the rigidity thereof. Such functionalized ionic liquids may potentially also be used as an adhesive monomer in reactive adhesives, so that a polymeric ionic liquid will be developed during the curing process.

Especially preferred chemical functionalizations are $—OR^c$, $—NR^cR^d$, $—COR^c$, $—COOR^c$, $—CO—NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other represent hydrogen, $C_1$-$C_6$-alkyl, $C_1$-$C_6$-halogenalkyl, cyclopentyl, cyclohexyl, phenyl, tolyl or benzyl.

In principle, according to the present invention to the adhesives described further above, generally to polymers of any kind, ionic liquids may be added as microwave recipients, as long as these are soluble in the adhesive mixture or may be gelled therein, respectively, thus being homogenously distributed.

The ionic liquids may also be dissolved in the adhesive mixture or gelled, they may be present colloidally or in an emulsified form. They may also be suspended as solid particles, if they have, e.g., a melting point above the currently prevailing surrounding temperature, they may, however, liquefy during the adhesive process due to an increase of temperature. This temperature increase may be induced by microwaves, or it may have a conventional reason, or it may have originated in the reaction heat.

The ionic liquids may be pure materials or mixtures of various ionic liquids and/or there may additionally be dissolved organic or inorganic salts, e.g., in order to increase the density of charge carriers therein and to increase the microwave coupling behaviour.

The ionic liquids may also be applied or introduced or injected, respectively, as a thin layer between to thermoplastic materials to be glued together or a thermoplastic material to be glued and another material in order to cause melting of the thermoplastic/s, hence carrying out a welding process.

In all the processes described, the correct contact pressure of the workpieces against one another is of utmost importance.

Because of the advantages mentioned it is possible to heat adhesives to which ionic liquids or functionalized ionic liquids have been added up to high temperatures "as if by command", locally restricted, very precisely and very fast, without having to heat the entire workpieces. This will protect the workpieces, accelerate the adhesive process, save energy, and leads to high final rigidities in reactive adhesives.

Adhesive connections may also be realized in inaccessible areas if the adhesives are already "installed", e.g., during the assembly of a complex workpiece and are only later activated using microwave irradiation. A conventional method of this type is used, e.g., in automobile construction ("spot-welded jointing"), wherein the parts to be glued together with the adhesive are fixed by means of spot-welding, wherein, however, then the entire workpiece has to be heated in order to activate the adhesive process and obtain a high rigidity.

Hot melt adhesive joints, later on, may be released quickly and conservingly, without having to heat the entire workpiece.

Using a microwave laser ("MASER") it is possible to activate the adhesive equipped with an ionic liquid in spatially resolved way and, hence, generate, for example, 2D- and 3D-structured and/or very small adhesive connections.

The invention claimed is:

1. A method for bonding a thermoplastic material, the method comprising the steps of:
providing a thermoplastic material;
applying an ionic liquid $[A]^+_a[B]^{a-}$ onto a surface of the thermoplastic material, wherein:
$[A]^+$ represents a cation,
$[B]^{a-}$ represents an anion, and
"a" represents an integer,
wherein the ionic liquid consists of organic cations and organic or inorganic anions and has a melting point below 100° C.;
contacting the thermoplastic material with a separate material to form an arrangement, wherein the surface of the thermoplastic material onto which the ionic liquid was applied is in contact with the separate material; and
exposing the arrangement to microwave radiation, whereupon the surface of the thermoplastic material onto which the ionic liquid was applied melts to enable adhesion of the thermoplastic material to the separate material,
wherein melting of the thermoplastic material is localized to the surface of the thermoplastic material onto which the ionic liquid was applied and wherein an area of the thermoplastic material onto which no ionic liquid was applied does not melt when the arrangement is exposed to the microwave radiation.

2. The method of claim 1, wherein the separate material is a second thermoplastic material.

3. The method of claim 1, wherein the ionic liquid is applied by introducing or injecting.

4. The method of claim 1, wherein a pressure is applied to contact the materials.

5. The method of claim 1, wherein [A]⁺ represents an ammonium cation [R¹R¹R²R³N]⁺, a phosphonium cation [R¹R¹R²R³P]⁺, a sulfonium cation [R¹R¹R²S]⁺, a hetero-aromatic cation, or a guanidinium cation R³R³'N(C=NR¹R¹')NR²R²' of the formula:

where R¹, R¹', R², R²' and R³, R³' represent hydrogen or one or more organic residues.

6. The method of claim 5, wherein R¹, R¹', R², R²' and R³, R³' represent independently of each other hydrogen or substituted or unsubstituted alkyl, alkenyl, alkynyl, cycloalkyl, cycloalkenyl, aryl, saturated or unsaturated heterocyclyl, or heteroaryl.

7. The method of claim 6, wherein the alkenyl, alkynyl, cycloalkyl, cycloalkenyl, aryl, saturated or unsaturated heterocyclyl, or heteroaryl, independently of each other, are substituted with one or more halogens and/or 1 to 3 residues selected from $(C_1-C_6)$alkyl, aryl, saturated or unsaturated heterocyclyl, $(C_3-C_7)$cycloalkyl, halogen, OW, SW, NR$^c$R$^d$, COR$^c$, COOR$^c$, CO—NR$^c$R$^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, and wherein R$^c$ and R$^d$ independently of each other represent hydrogen, $(C_1-C_6)$alkyl, halo$(C_1-C_6)$alkyl, cycloalkyl, cyclopentyl, cyclohexyl, phenyl, tolyl or benzyl.

8. The method of claim 6, wherein two of the residues R¹, R¹', R², R²', R³, R³' together with a hetero atom to which they are bound form a saturated or unsaturated ring, which is unsubstituted or substituted.

9. The method of claim 7, wherein at least one carbon chain is disrupted by one or several hetero atoms selected from the group consisting of O, S, NH and N(C1-C4)alkyl.

10. The method of claim 6, wherein at least one of R¹, R¹', R², R²' and R³, R³' represents an saturated or unsaturated heterocyclyl and the heterocyyl residue is an unsaturated 5- or 6-membered hetero-aromatic selected from:

wherein,
R, R¹' independently of each other represent hydrogen, $(C_1-C_{30})$alkyl, $(C_3-C_{12})$cycloalkyl, $(C_2-C_{30})$alkenyl, $(C_3-C_{12})$cycloalkenyl, aryl, saturated or unsaturated heterocyclyl, or heteroaryl, wherein the 6 residues last mentioned are each independently of each other unsubstituted or substituted byone or several halogen residues, and/or 1 to 3 residues selected from the group consisting of $(C_1-C_{30})$alkyl, aryl, saturated or unsaturated heterocyclyl, heteroaryl, $C_3-C_7$)cycloalkyl, halogen, OR$^c$, SR$^c$, NR$^c$R$^d$, COR$^c$, COOR$^c$, CO—NR$^c$R$^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein R$^c$ and R$^d$ independently of each other represent hydrogen, $(C_1-C_6)$alkyl, halo$(C_1-C_6)$alkyl, cycloalkyl, cyclopentyl, cyclohexyl, phenyl, tolyl or benzyl;

$R^4$, $R^5$, $R^6$, $R^7$, $R^8$ independently of each mean hydrogen, halogen, nitro, cyano, $OR^c$, $SR^c$, $NR^cR^d$, $COR^c$, $COOR^c$, $CO-NR^cR^d$, $(C_1-C_{30})$alkyl, $(C_3-C_{12})$cycloalkyl, $(C_2-C_{30})$alkenyl, $(C_3-C_{12})$cycloalkenyl, aryl, saturated or unsaturated heterocyclyl, or heteroaryl, wherein the 6 residues last mentioned are each independently of each unsubstituted or substituted by one or several halogen and/or 1 to 3 residues selected from the group consisting of $(C_1-C_6)$alkyl, aryl, saturated or unsaturated heterocyclyl, heteroaryl, $(C_3-C_7)$cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other represent hydrogen, $(C_1-C_6)$alkyl, halo$(C_1-C_6)$alkyl, cycloalkyl, cyclopentyl, cyclohexyl, phenyl, tolyl or benzyl, or two of the residues R, $R^4$, $R^5$, $R^6$, $R^7$, $R^8$, which are adjacent to each other, form together with the atom, to which they are bound, a ring, wherein the ring is unsaturated, saturated, or aromatic and unsubstituted or substituted, and wherein the carbon chain formed by the respective residues may be disrupted by one or several heteroatoms selected from the group consisting of O, S, N, NH or N($C_1-C_4$)alkyl;

$R^e$, $R^f$, $R^g$, $R^h$ independently of each other mean hydrogen, alkyl, alkenyl, alkynyl, cycloalkyl, cycloalkenyl, aryl or heteroaryl residues, wherein the 7 residues last mentioned independently of each other may support one or several halogen residues and/or 1 to 3 residues selected from the group consisting of $(C_1-C_6)$alkyl, aryl, heteroaryl, $(C_3-C_7)$cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, alkoxy siloxane, wherein $R^c$ and $R^d$ independently of each other mean hydrogen, $(C_1-C_6)$alkyl, halo$(C_1-C_6)$alkyl, cycloalkyl, cyclopentyl, cyclohexyl, phenyl, tolyl or benzyl.

11. The method of claim 1, wherein $[B]^{a-}$ is selected from:

fluoride, chloride, bromide, iodide, dicyanamide, thiocyanate; perchlorate, hexafluorophosphate, nitrite, nitrate, sulphate, hydrogen sulphate, carbonate, hydrogen carbonate, alkyl carbonate, methyl carbonate, aryl carbonate; phosphate; hydrogen phosphate; dihydrogen phosphate; sulfamate $H_2N-SO_3^-$, deprotonated acesulfame, deprotonated saccharine, cyclamate;

a tetra-substituted borate of the general formula (Va) $[BR^iR^jR^kR^l]^-$, wherein $R^i$ to $R^l$ independently of each other represent fluoro or $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, wherein the 6 residues last mentioned independently of each other are unsubstituted or substituted by one or several halogen and/or 1 to 3 residues selected from the group consisting of $(C_1-C_{30})$alkyl, aryl, saturated or unsaturated heterocyclyl, $(C_3-C_7)$cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, and alkoxy siloxane, wherein $R^c$ and $R^d$ independently of each other represent hydrogen, $(C_1-C_6)$alkyl, halo $(C_1-C_6)$alkyl, cycloalkyl, cyclopentyl, cyclohexyl, phenyl, tolyl or benzyl; or two of the residues $R^i$ to $R^l$ form together with the boron atom, to which they are bound, a five-, six- or seven-membered ring, wherein this may be saturated or unsaturated, unsubstituted or substituted and wherein the carbon chain formed by the respective carbon atoms may be disrupted by one or several heteroatoms selected from the group consisting of O, S, N, NH or N—$C_1$-$C_4$-alkyl, or organic sulfonate of the general formula (Vb)$[R^m-SO_3]^-$ or organic sulphate of the general formula (Vc)$[R^m-OSO_3]^-$, wherein $R^m$ represents $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, wherein the 6 residues mentioned last independently of each other are unsubstituted or substituted by one or several halogen, and/or 1 to 3 residues selected from the group consisting of $(C_1-C_{30})$alkyl, aryl, saturated or unsaturated heterocyclyl, $(C_3-C_7)$cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, and alkoxy siloxane, wherein $R^c$ and $R^d$ independently of each other represent hydrogen, $(C_1-C_6)$alkyl, halo$(C_1-C_6)$alkyl, cycloalkyl, cyclopentyl, cyclohexyl, phenyl, tolyl or benzyl;

carboxylate of the general formula (Vd) $[R^n-COO]^-$, wherein $R^n$ represents hydrogen or $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, wherein the 6 residues mentioned last independently of each other are unsubstituted or substituted by one or several halogen, and/or 1 to 3 residues selected from the group consisting of the group $(C_1-C_{30})$alkyl, aryl, saturated or unsaturated heterocyclyl, $(C_3-C_7)$cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, and alkoxy siloxane, wherein $R^c$ and $R^d$ independently of each other represent hydrogen, $(C_1-C_6)$alkyl, halo$(C_1-C_6)$alkyl, cycloalkyl, cyclopentyl, cyclohexyl, phenyl, tolyl or benzyl; or carboxylate, which formally is derived by way of deprotonation of one or optionally also several carboxylic acid groups of fruit acids, saccharic acids, amino acids, fatty acids, volatile acids and resin acids or which is conjugated into these acids, respectively;

a (fluoroalkyl)fluorophosphate of the general formula (Ve) $[PF_x(C_yF_{2y+1-z}H_z)_{6-x}]^-$, wherein $1 \leq x \leq 6$, $1 \leq y \leq 8$ and $0 \leq z \leq 2y+1$; or an imide of the general formulae (Vf) $[R^o-SO_2-N-SO_2-R^p]^-$, (Vg) $[R^q-SO_2-N-CO-R^r]^-$ or (Vh) $[R^s-CO-N-CO-R^t]^-$, wherein $R^o$ to $R^t$ independently of each other represent hydrogen or $(C_1-C_{30})$alkyl, $(C_3-C_{12})$cycloalkyl, $(C_2-C_{30})$alkenyl, $(C_3-C_{12})$cycloalkenyl, aryl or saturated or unsaturated heterocyclyl, wherein the 6 residues mentioned last independently of each other are unsubstituted or substituted by one or several halogen and/or 1 to 3 residues selected from the group consisting of $(C_1\text{-}C_{30})$alkyl, aryl, saturated or unsaturated heterocyclyl, $(C_3\text{-}C_7)$cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, and alkoxy siloxane, wherein $R^c$ and $R^d$ independently of each other represent hydrogen, $(C_1\text{-}C_6)$alkyl, halo$(C_1\text{-}C_6)$alkyl, cycloalkyl, cyclopentyl, cyclohexyl, phenyl, tolyl or benzyl;

an organic phosphate of the general formula (Vi) $[R^u-OPO_3]^{2-}$ or (Vj) $[R^uO-PO_2-OR^v]^-$ or an organic phosphonate of the general formula (Vk) $[R^u-PO_3]^{2-}$ or (Vl) $[R^u-PO_2-OR^v]^-$, wherein $R^u$ and $R^v$ independently of each other represent hydrogen or $(C_1\text{-}C_{30})$ alkyl, $(C_3\text{-}C_{12})$cycloalkyl, $(C_2\text{-}C_{30})$alkenyl, $(C_3\text{-}C_{12})$ cycloalkenyl, aryl or heteroaryl, wherein the 6 residues mentioned last independently of each other are unsubstituted or substituted by one or several halogen and/or 1 to 3 residues selected from the group consisting of $(C_1\text{-}C_{30})$alkyl, aryl, saturated or unsaturated heterocyclyl, $(C_3\text{-}C_7)$cycloalkyl, halogen, $OR^c$, $SR^c$, $NR^cR^d$, $COR^c$, $COOR^c$, $CO-NR^cR^d$, acrylate, methacrylate, cyanoacrylate, epoxide, vinyl, vinyl ether, vinyl ester, styrene, allyl, phenol, alkyl phenol, ketone, amidoamine, urea, urethane, imidazole, benzimidazole, isocyanate, dicarboxylic acid anhydride, resorcinol, melamine, siloxane, and alkoxy siloxane, wherein $R^c$ and $R^d$ independently of each other represent hydrogen, $C_1\text{-}C_6$-alkyl, $C_1\text{-}C_6$-halogenalkyl, cyclopentyl, cyclohexyl, phenyl, tolyl or benzyl.

12. A method according to claim 11, wherein defined, carbon containing, organic, saturated or unsaturated, acyclic or cyclic, aliphatic, aromatic or araliphatic residues contain 1 to 30 carbon atoms, the residues $R^i$ to $R^l$ at the tetra-substituted borate (Va), the residue $R^m$ at the organic sulfonate (Vb) and sulphate (Vc), the residue $R^n$ at the carboxylate (Vd), the residues $R^o$ to $R^t$ at the (fluoroalkyl)fluoro phosphate (Ve), the imides (Vf), (Vg) and (Vh), the residues $R^u$ and $R^v$ at the organic phosphates (Vi), (Vj) and the organic phosphonates (Vk), (Vl) independently of each other mean:

$(C_1\text{-}C_{30})$alkyl and the aryl-, heteroaryl-, cycloalkyl-, halogen-, hydroxy-, amino-, carboxy-, formyl-, —O—, —CO—, —CO—O— or —CO—N<substituted components thereof, methyl, ethyl, 1-propyl, 2-propyl, 1-butyl, 2-butyl, 2-methyl-1-propyl (isobutyl), 2-methyl-2-propyl (tert.-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_nF_{2(n-a)+(1-b)}H_{2a+b}$ with n≤30, 0≤a≤n and b=0 or 1;

$(C_3\text{-}C_{12})$cycloalkyl and the aryl-, heteroaryl-, cycloalkyl-, halogen-, hydroxy-, amino-, carboxy-, formyl-, —O—, —CO—, —CO—O-substituted components thereof, cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_nF_{2(n-a)-(1-b)}H_{2a-b}$ with n≤30, 0≤a≤n and b=0 or 1;

$(C_2\text{-}C_{30})$alkenyl and the aryl-, heteroaryl-, cycloalkyl-, halogen-, hydroxy-, amino-, carboxy-, formyl-, —O—, —CO—, —CO—O-substituted components thereof, 2-propenyl, 3-butenyl, cis-2-butenyl, trans-2-butenyl or $C_nF_{2(n-a)-(1-b)}H_{2a-b}$ with n≤30, 0≤a≤n and b=0 or 1;

$(C_3\text{-}C_{12})$cycloalkenyl and the aryl-, heteroaryl-, cycloalkyl-, halogen-, hydroxy-, amino-, carboxy-, formyl-, —O—, —CO—, —CO—O-substituted components thereof, 3-cyclopentenyl, 2-cyclohexenyl, 3-cyclohexenyl, 2,5-cyclohexadienyl or $C_nF_{2(n-a)-3(1-b)}H_{2a-3b}$ with n≤30, 0≤a≤n and b=0 or 1;

aryl, saturated or unsaturated heterocyclyl, or heteroaryl having 2 to 30 carbon atoms and the alkyl-, aryl-, heteroaryl-, cycloalkyl-, halogen-, hydroxy-, amino-, carboxy-, formyl-, —O—, —CO— or —CO—O-substituted components thereof.

13. The method of claim 1, wherein anion $[B]^{a-}$ is a complex of a central metal atom $M^{+v}$ of the oxidation number v=1,2,3,4,5 or 6 and ligands $X^-$, wherein $M^{+v}$ is selected from the elements of the transition metals, wherein each individual of the ligands X is independently of each other selected from: fluoride, chloride, bromide, iodide, thiocyanate, dicyanamide, nitrite; nitrate; acetyl acetone; acyl; adenine; 2,2'-azobisisobutyronitrile; alanine; allyl; allyloxycarbonyl; water; aryl; arginine; asparagine; aspartate; BIABN; biotinyl; 2,2'-bis(diphenyl-phosphino)-6,6'-dimethoxy-1,1'-biphenyl; 2,2'-binaphtyldiphenyl-diphosphine; 1,2-bis[4,5-dihydro-3H-binaphtho[1,2-c:2',1'-e]phosphepino]benzol; 1,1'-bis {4,5-dihydro-3H-dinaphtho[1,2-c: 2',1'-e]phosphepino}ferrocene; 4,4'-di-tert-butyl-4,4',5,5'-tetrahydro-3,3'-bis-3H-di-naphtho[2,1-c:1',2'-e]phosphepine; BINAL; 4,5-dihydro-3H-dinaphtho[2,1-c;1',2'-e]phosphepine; 2,2'-binaphtyldiol; bis-tert-butyl-bipyridine; benzylmethylphenylphosphine; benzyl; tert-butoxycarbonyl; bis(2-((S)-4-iso-propyl-4,5-dihydrooxazol-2-yl)phenyl)amine; bis(2-((S)-4-tert-butyl-4,5-dihydrooxazol-2-yl)phenyl)amine; 1,2-bis(2,5-diethyl-phospholano)-ethane; butoxy-carbonyl-4-diphenylphosphino-2-diphenylphosphino-methyl-pyrrolidine; 2,2'-bipyridin; benzoyl; benzyloxycarbonyl; CO; cycloheptatrienyl; citrulline; citrate; cyanide; cyclooctadiene; cyclooctatetraene; cyclopentadienyl; pentamethylcyclopentadienyl; cyclohexyl; cytidine; cysteine; cytosine; dibenzilidenacetone; O-isopropylidene-2,3-dihydroxy-1,4-bis(diphenylphosphino)butane; (1R,2R)-bis[(2-methoxyphenyl)phenyl-phosphino]ethane; 4-dimethylamino pyridine; dimethylglyoxime, dipivaloyl methanate; Dess-Martin periodinane; 1,4,7,10-tetraaza-cyclododecane-1,4,7,10-tetraacetate; diphenylphosphenylethane; diphenylphosphenyl methane; diphenylphosphenyl propane; desoxy ribose; diethylentriamine-pentaacetate; bis(2,5-dimethylphospholano)-benzol; ethylene diamintetraacetate; ethylene diamine; fluorenyl methoxycarbonyl; 7,7-dimethyl-1,1,1,2,2,3,3-heptafluorooctan-4,6-dionato; galactose; galactosamine; N-acetyl galactosamine, glycolyl; glucose; glucosamine, N-acetyl-glucosamine, glutamine, glutamate, glycine, guanine; guanosine; haemoglobin; hexafluoroacetyl acetonate; histidine; hexamethyl phosphoric acid triamide; hydroxyproline; isoleucine; leucine; lysine; 2,2'-bis[(N,N-dimethylamino)(phenyl) methyl]-1,1'-bisdicyclohexyl-phosphino)ferrocene; myoglobin; methionine; methaemoglobin; metmyoglobin; 3,5-dioxa-4-phosphacyclohepta[2,1-a;3,4-a']dinapthalene-4-yl)dimethyl amine; methylphenyl-propyl phosphine; methylsulfone; bicyclo[2.2.1]hepta-2,5-; neuraminic acid; N-acetyl-neuraminic acid; N-glycolyl-neuraminic acid; 2,3-bis(diphenylphosphino)-bicyclo[2.2.1]hept-5-ene; nitrilo-triacetic acid; ornithine; succinate; oxalate; phenyl o-anisylmethyl phosphine; phthalo cyanine; phenyl alanine; phenanthroline; picolyl amine; piperidine; para-nitro-benzoic acid; porphyrin; proline; pyridyl; PYBOX; pyroglutamate; pyrazine; ribose; sarcosine; salene; serine; succinyl; 1,4,7-triazacyclononane; tert-butyl-di-methyl-silyl; tartrate; terpyridine; thymidine; threonine; thymine; tetramethylethylene diamine; trimesic acid; tris(pyrazolyl) borate; triphenyl phosphane; tryptophane; tyrosine; tetrazole; ubiquitin; uracil; uridine; valine.

14. The method of claim 13, wherein the complex is a complex of the general formula $[M^{+\nu}X_{\nu+1}]^-$ or $[M^{+\nu}X_{\nu+2}]^{2-}$ or $[M^{+\nu}X_{\nu+3}]^{3-}$.

15. The method of claim 13, wherein $M^{+\nu}$ is selected from Ag, Al, Ce, Cs, Cr, Co, Cu, Dy, Er, Eu, Gd, Ho, Ir, Fe, Mn, Mo, Nd, Ni, Pt, Pr, Re, Rh, Rb, Ru, Sm, Sn, Ta, Tb, Tm, Ti, W, V and Y.

16. The method of claim 15, wherein $M^{+\nu}$ is selected from $Ag^+$, $Al^{+3}$, $Ce^{+2}$, $Ce^{+3}$, $Ce^{+4}$, $Cs^{+1}$, $Cr^{+2}$, $Cr^{+3}$, $Cr^{+6}$, $Co^{+2}$, $Co^{+3}$, $Cu^{n}$, $Cu^{+2}$, $Dy^{+3}$, $Er^{+2}$, $Eu^{+3}$, $Gd^{+2}$, $Gd^{+3}$, $Ho^{+2}$, $Ho^{+3}$, $Ir^{+4}$, $Fe^{+2}$, $Fe^{+3}$, $Mn^{+2}$, $Mn^{+3}$, $Mo^{+2}$, $Mo^{+3}$, $Mo^{+4}$, $Mo^{+5}$, $Nd^{+2}$, $Nd^{+3}$, $Ni^{+2}$, $Ni^{+3}$, $Pt^{+4}$, $Pr^{+2}$, $Pr^{+3}$, $Re^{+4}$, $Re^{+5}$, $Re^{+6}$, $Rh^{+2}$, $Rh^{+3}$, $Rb^{+4}$, $Ru^{+3}$, $Ru^{+4}$, $Sn^{+2}$, $Sn^{+4}$, $Sm^{+2}$, $Sm^{+3}$, $Ta^{+5}$, $Tb^{+3}$, $Tm^{+3}$, $Ti^{+2}$, $Ti^{+3}$, $W^{+4}$, $W^{+5}$, $V^{+2}$, $V^{+3}$, $V^{+4}$, $V^{+5}$, $Y^{+2}$ and $Y^{+3}$.

17. The method of claim 1, wherein 5-95 wt. % metal salts $[M]_x^{b+}[B]_y^{a-}$ have been added to the ionic liquids, wherein a, b, x, y independently of each other mean the integers 1, 2, 3 or 4 and wherein the product of x and b equals the product of y and a.

18. The method of claim 17, wherein metal cations of the metal salts are selected from $Cr^{+2}$, $Cr^{+3}$, $Co^{+2}$, $Co^{+3}$, $Cu^{+1}$, $Cu^{+2}$, $Fe^{+2}$, $Fe^{+3}$, $Mn^{+2}$, $Ni^{+2}$, $Ni^{+3}$, $Ti^{+2}$, $Ti^{+3}$, $Li^+$, $Na^+$, $K^+$, $Cs^+$, $Mg^{2+}$, $Ca^{2+}$, $Ba^2$, $Sr^{2+}$, $Zr^{4+}$, $Sn^{2+}$, $Sn^{4+}$, $Ag^+$, $Zn^{2+}$ and $Al^{3+}$.

19. A method for bonding a thermoplastic material, the method comprising the steps of:

providing a thermoplastic material;
applying an ionic liquid $[A]^+_a[B]^{a-}$ onto a surface of the thermoplastic material to form a treated surface region, wherein:
  $[A]^+$ represents a cation,
  $[B]^{a-}$ represents an anion, and
  "a" represents an integer,
wherein the ionic liquid consists of organic cations and organic or inorganic anions and has a melting point below 100° C.;
contacting the thermoplastic material with a separate material to form an arrangement in which the treated surface region of the thermoplastic material is in contact with the separate material; and
exposing the arrangement to microwave radiation, whereupon the treated surface region of the thermoplastic material melts at a lower temperature than an untreated surface region of the thermoplastic material onto which no ionic material was applied to enable adhesion of the treated surface region of the thermoplastic material to the separate material.

20. The method of claim 19, wherein the untreated surface region onto which no ionic liquid was not applied does not melt when the arrangement is exposed to microwave radiation.

21. A method for bonding a thermoplastic material, the method comprising the steps of:

providing a thermoplastic material;
applying an adhesion promoting material consisting essentially of an ionic liquid $[A]^+_a[B]^{a-}$ onto a surface of the thermoplastic material, wherein:
  $[A]^+$ represents a cation,
  $[B]^{a-}$ represents an anion, and
  "a" represents an integer,
wherein the ionic liquid consists of organic cations and organic or inorganic anions and has a melting point below 100° C.;
contacting the thermoplastic material with a separate material to form an arrangement, wherein the surface of the thermoplastic material onto which the ionic liquid was applied is in contact with the separate material; and
exposing the arrangement to microwave radiation, whereupon the surface of the thermoplastic material onto which the ionic liquid was applied melts to enable adhesion of the thermoplastic material to the separate material.

22. The method of claim 21, wherein melting of the thermoplastic material is localized to the surface of the thermoplastic material onto which the ionic liquid was applied and wherein an area of the thermoplastic material onto which no ionic liquid was applied does not melt when the arrangement is exposed to the microwave radiation.

* * * * *

UNITED STATES PATENT AND TRADEMARK OFFICE
CERTIFICATE OF CORRECTION

Page 1 of 1

PATENT NO. : 11,084,954 B2
APPLICATION NO. : 16/266944
DATED : August 10, 2021
INVENTOR(S) : Robert Wutti et al.

It is certified that error appears in the above-identified patent and that said Letters Patent is hereby corrected as shown below:

On the Title Page

Item (57), Abstract, Line 1, change "method method" to –method–

In the Specification

Column 1
Line 18, change "word-wide" to –world-wide–

Column 17
Line 8, change "3 gram" to –3 grams–

Column 18
Line 21, change "beginning" to –begin–

Column 19
Line 6, change "150 s seconds" to –150 seconds–

Column 20
Line 10, change "to" to –two–
Line 40-41, change "in spatially" to –in a spatially–

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*